Figure 8:
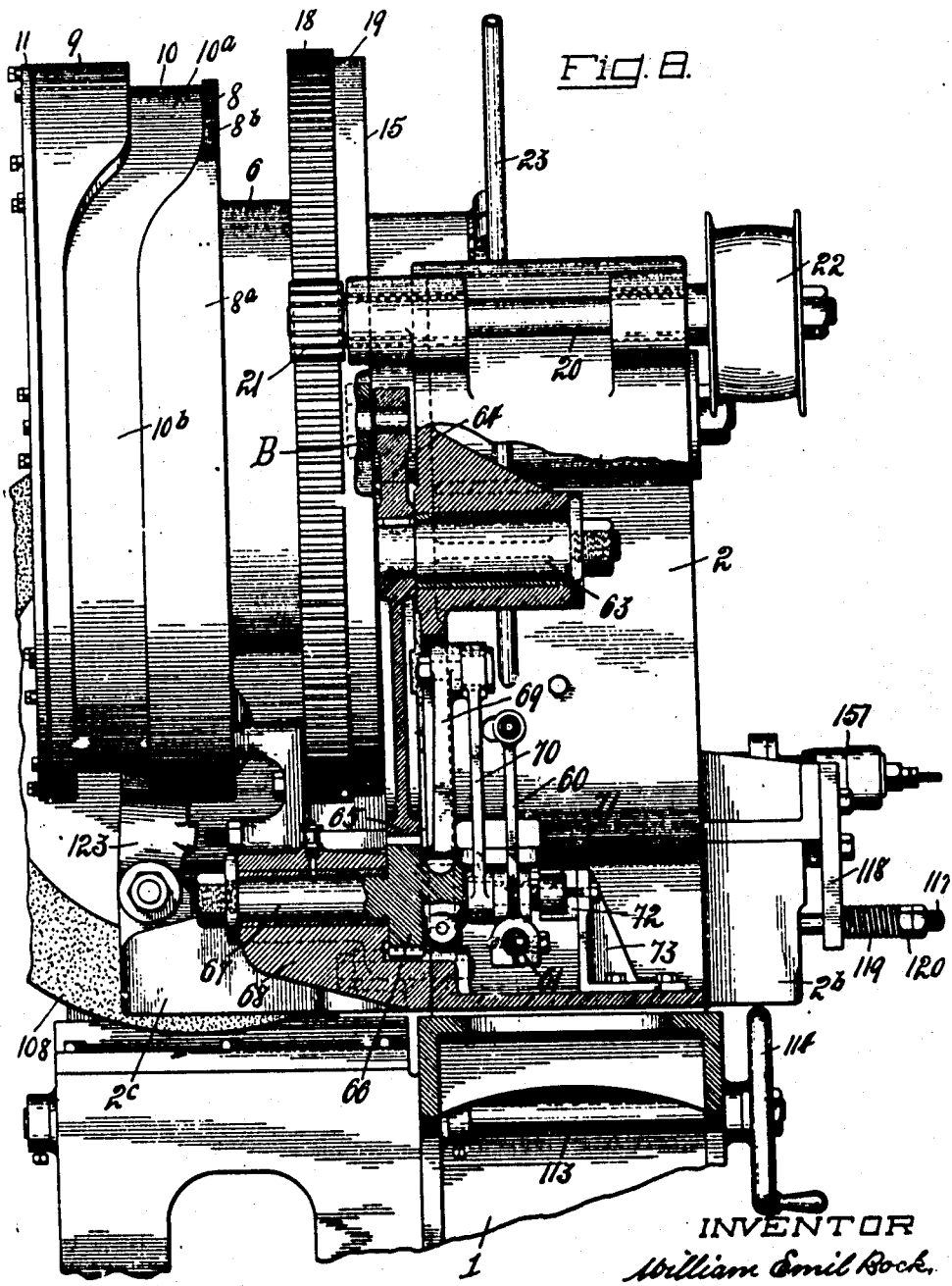

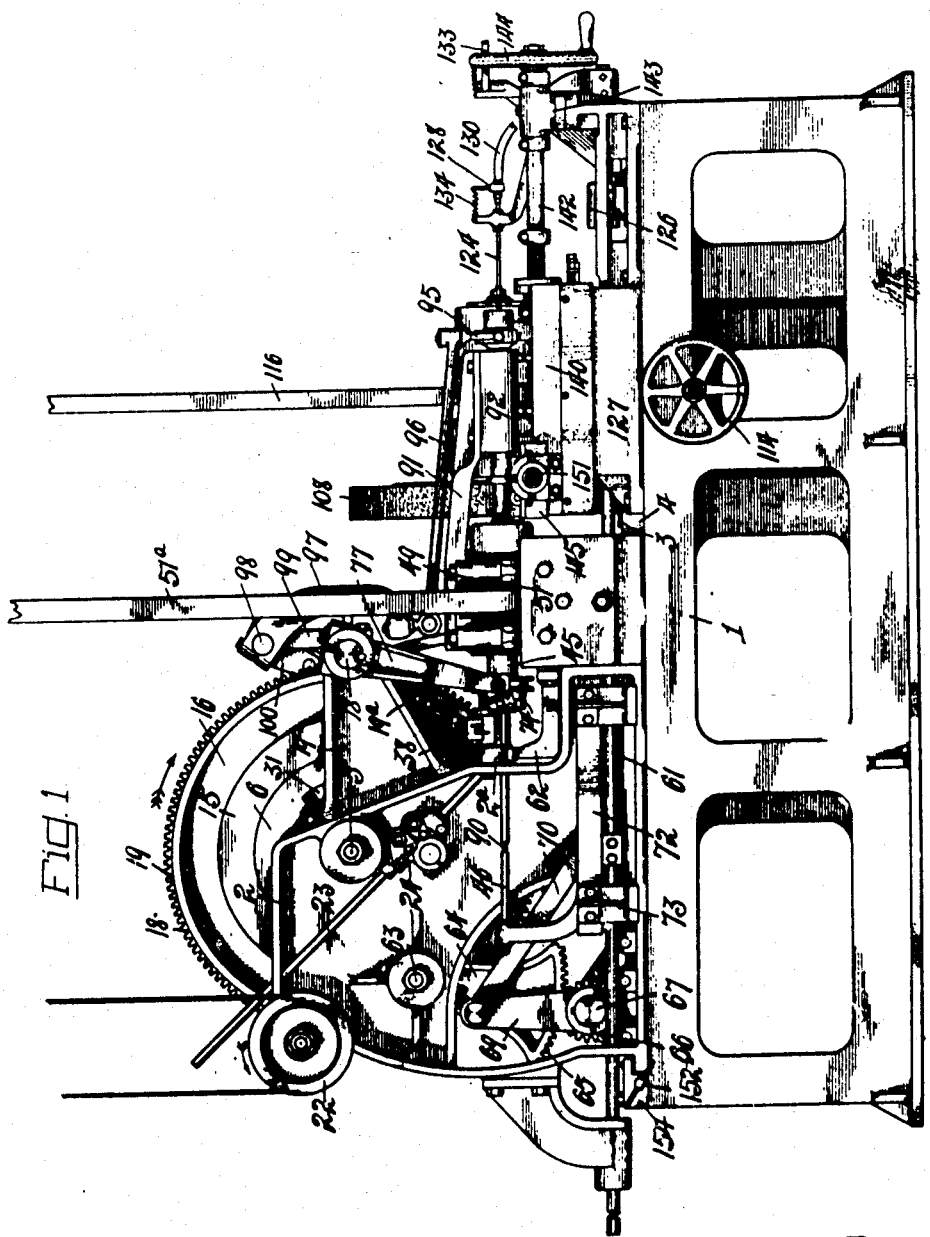

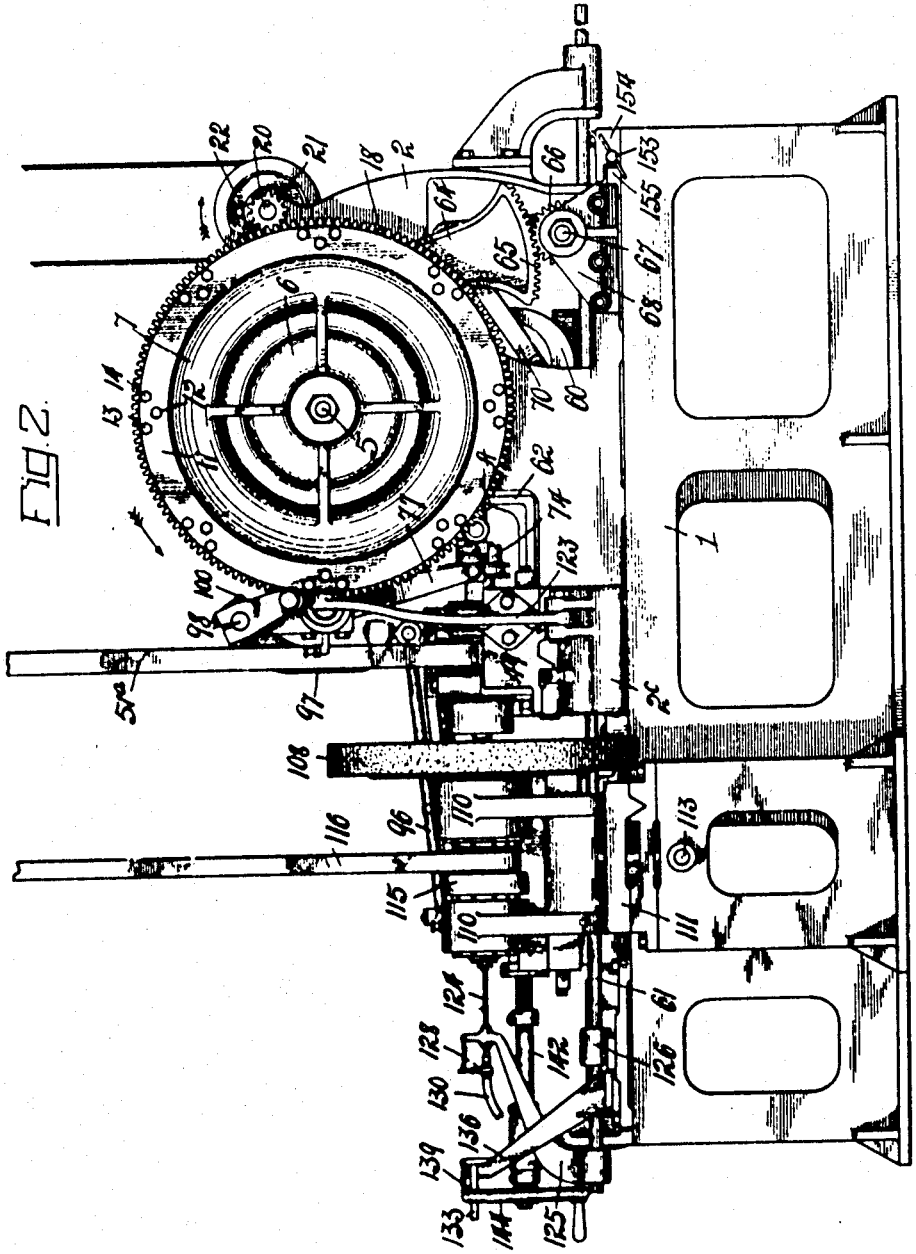

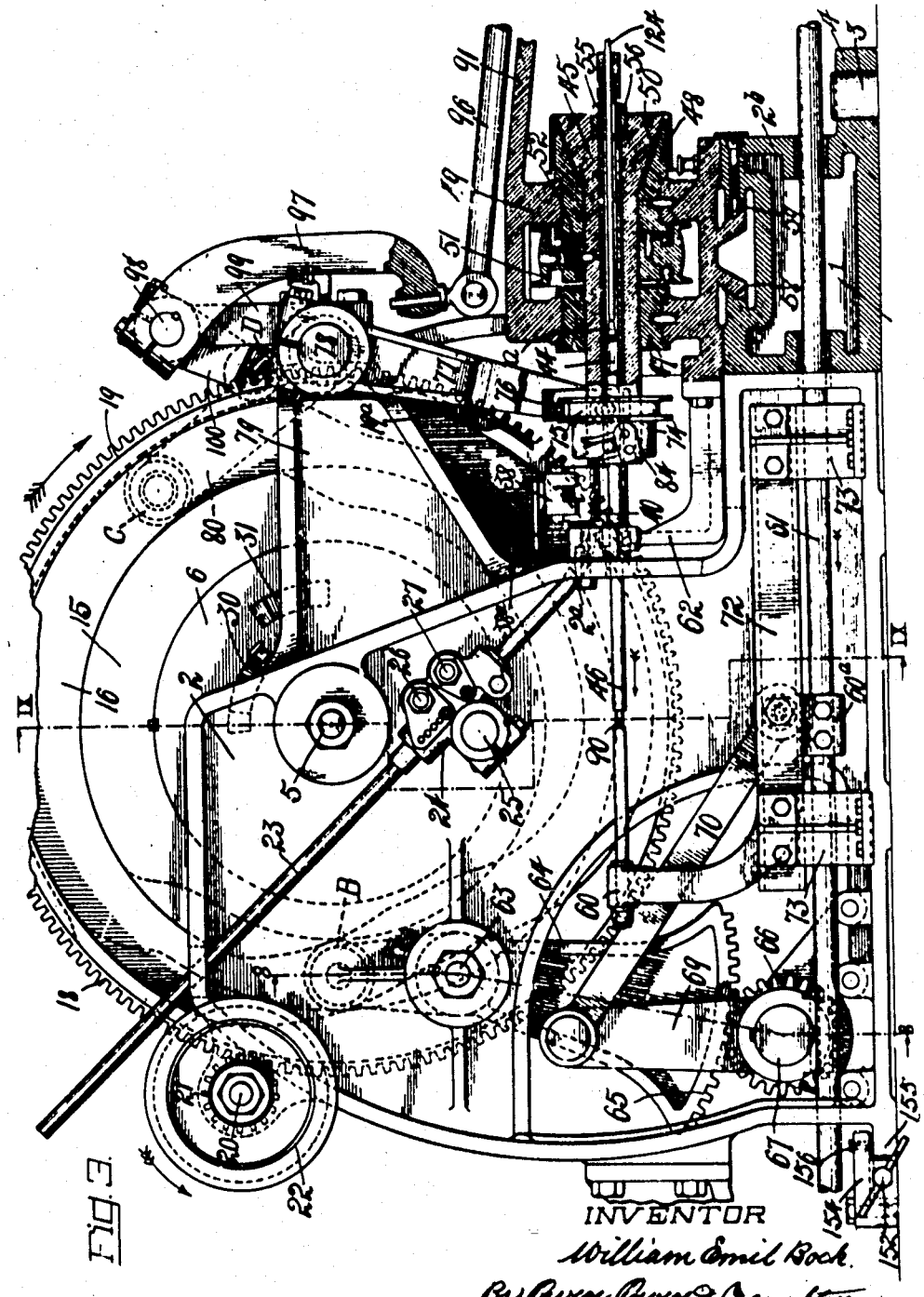

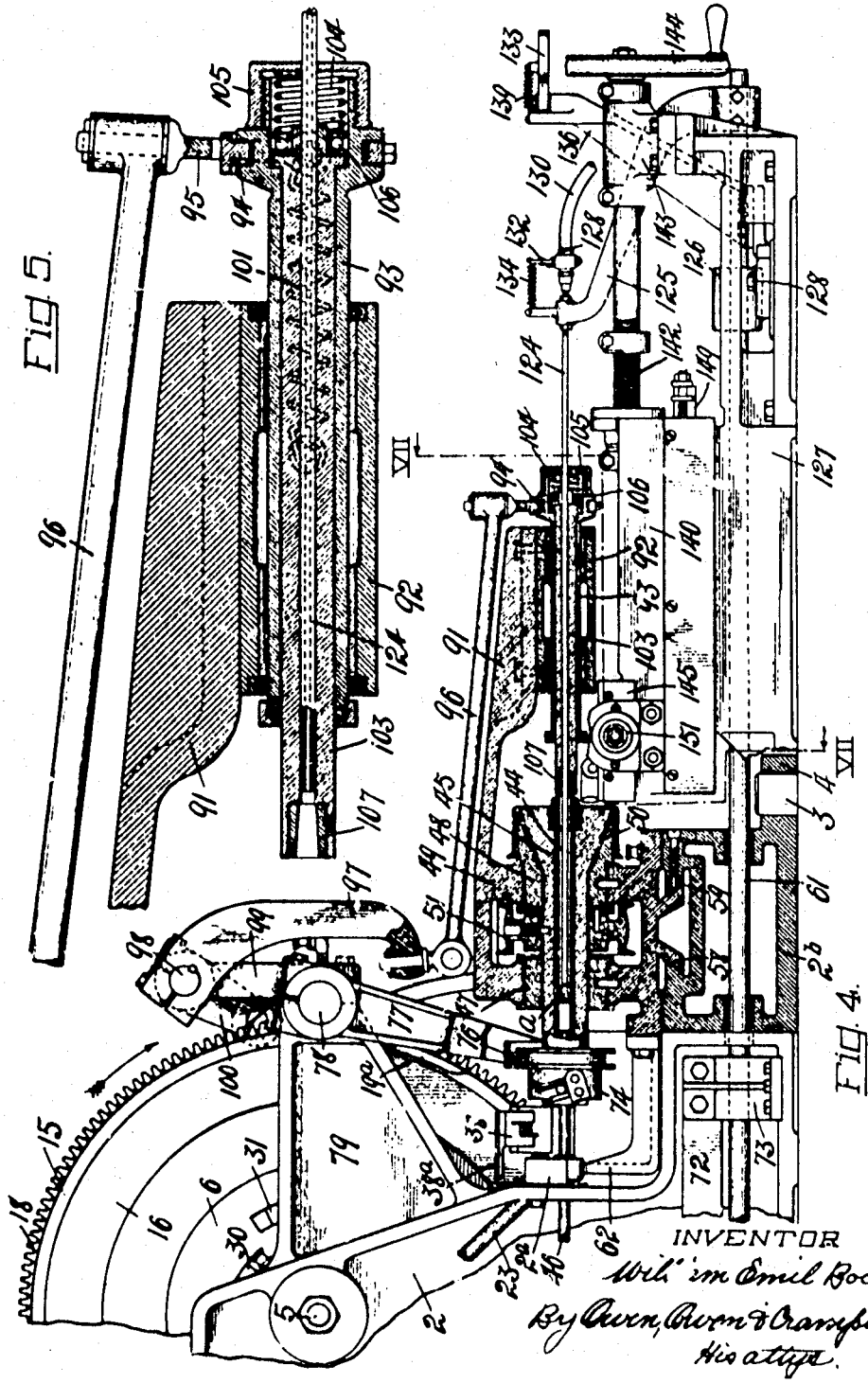

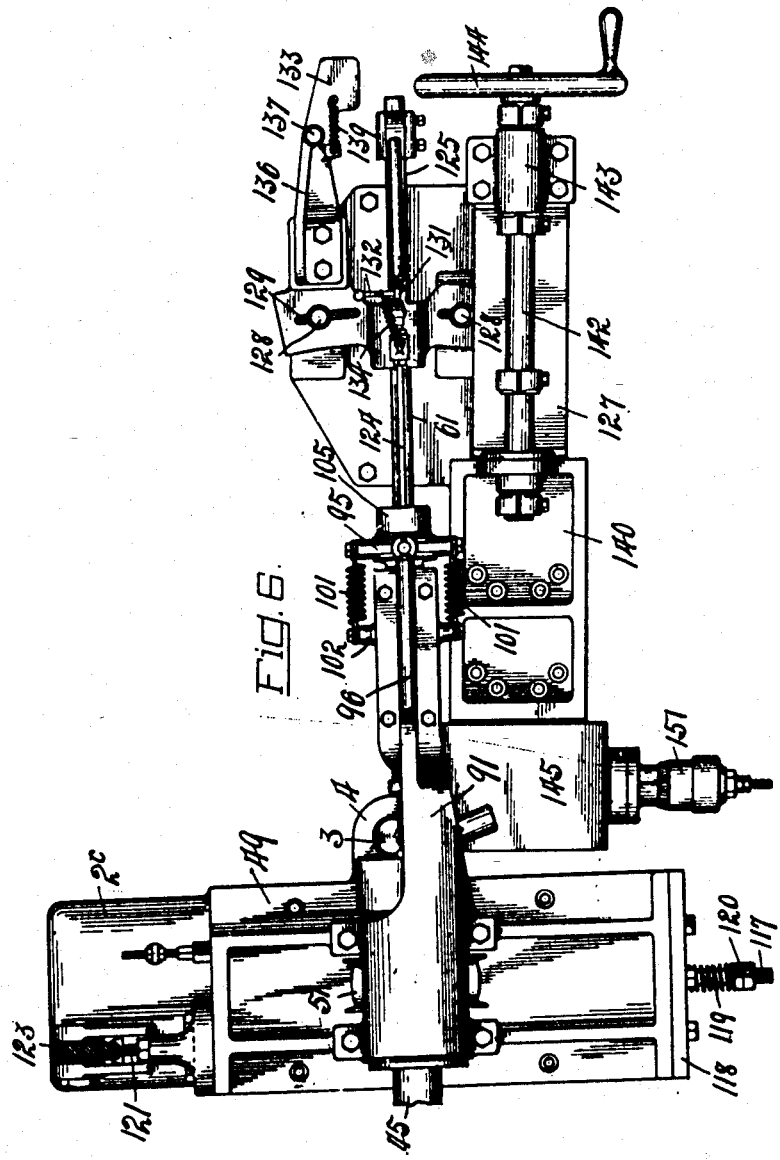

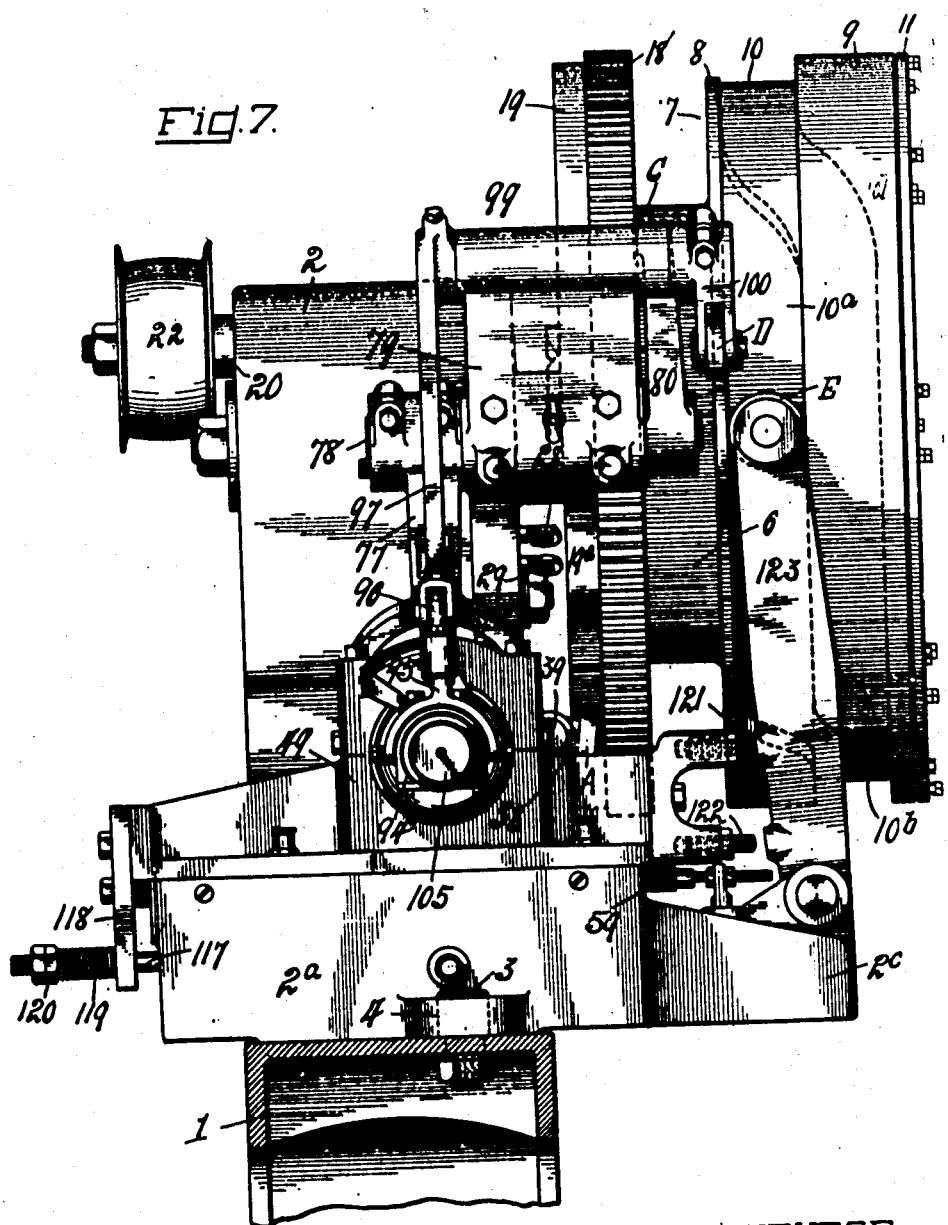

W. E. BOCK.
ARTICLE GRINDING MACHINE.
APPLICATION FILED MAR. 19, 1917.

1,310,386.

Patented July 15, 1919.
15 SHEETS—SHEET 1.

INVENTOR
William Emil Bock.
By Owen, Owen & Crampton,
His attys.

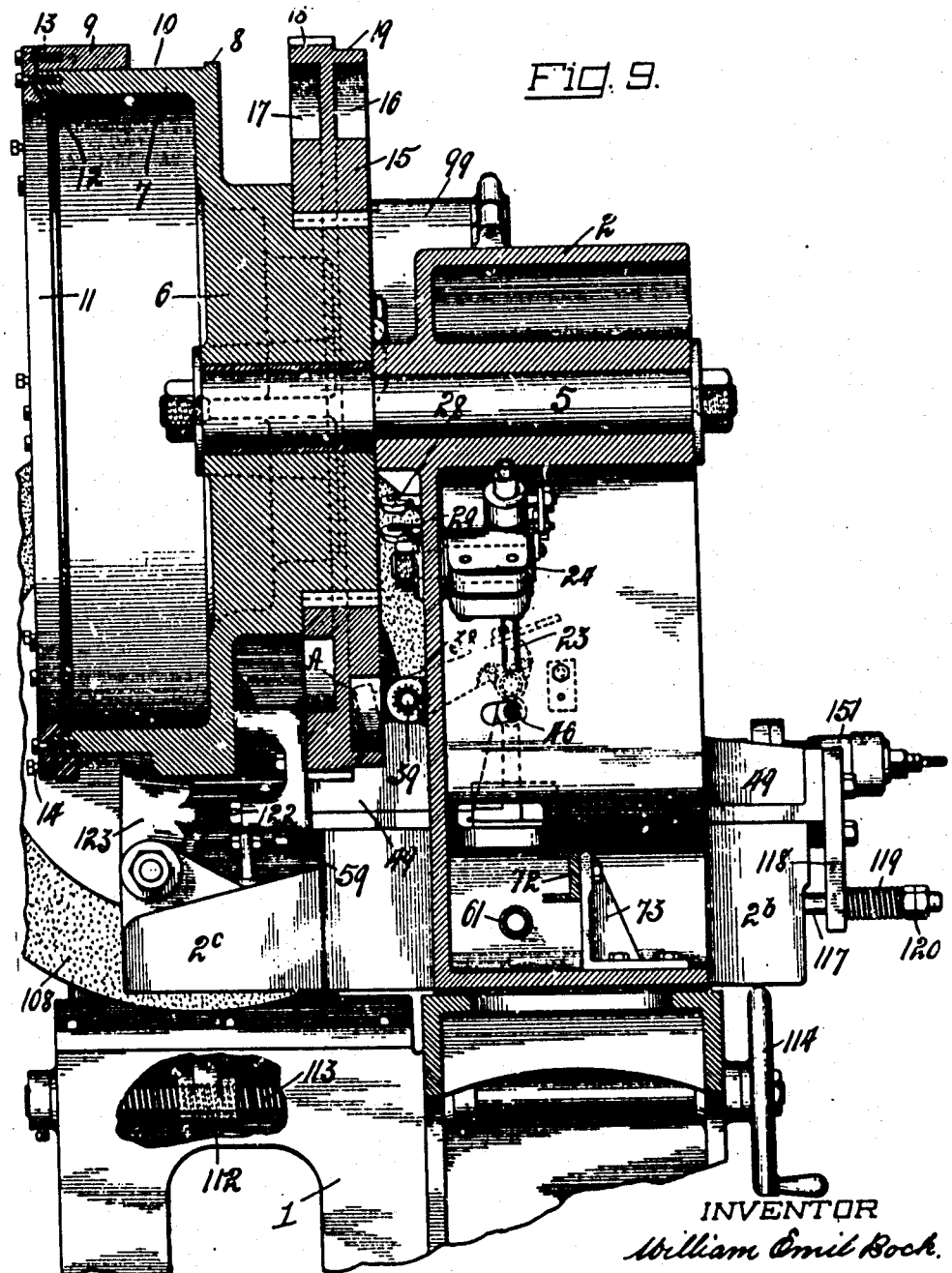

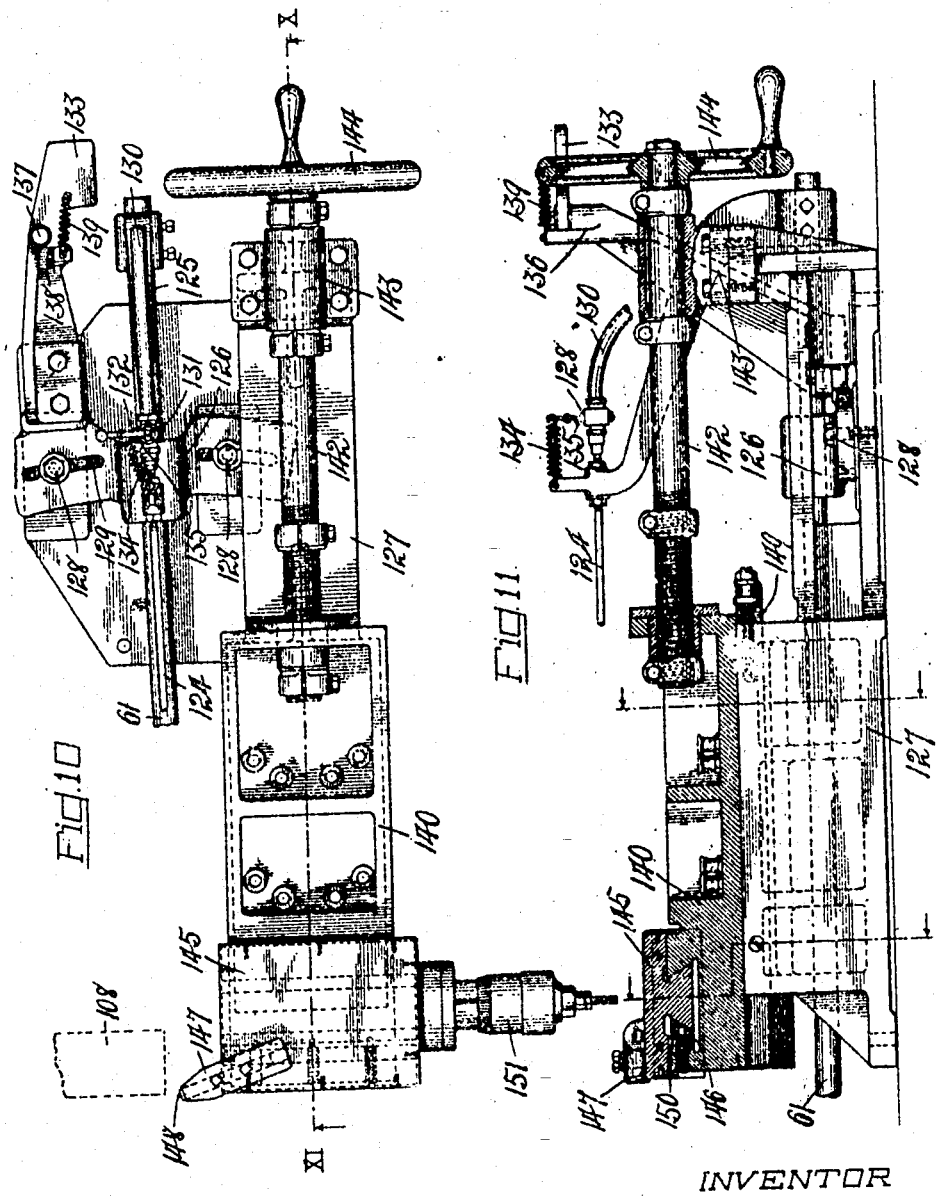

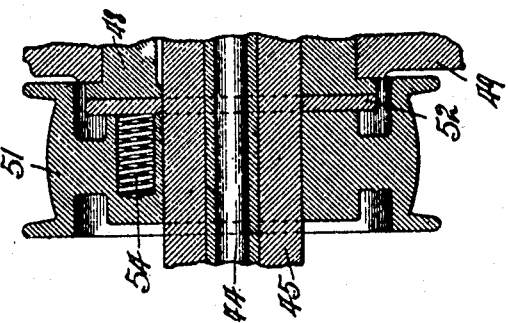
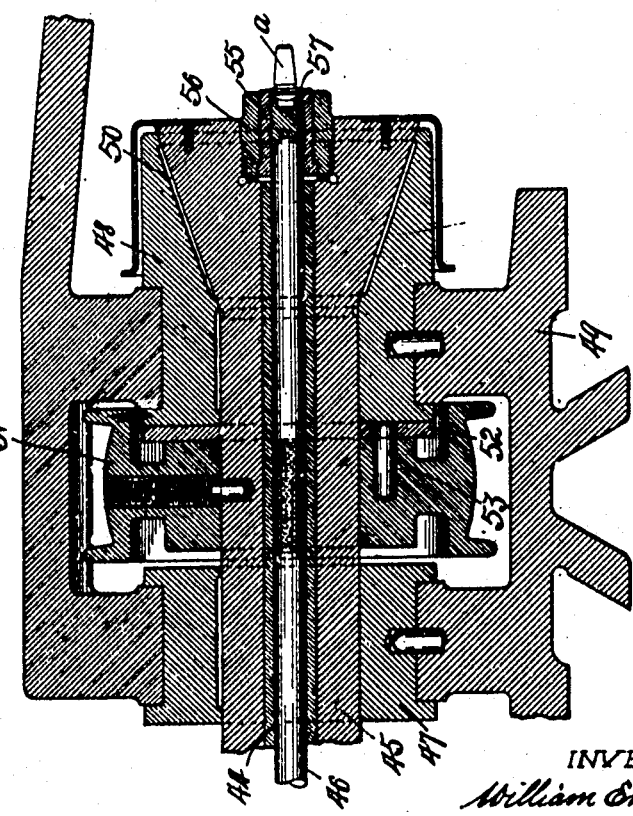

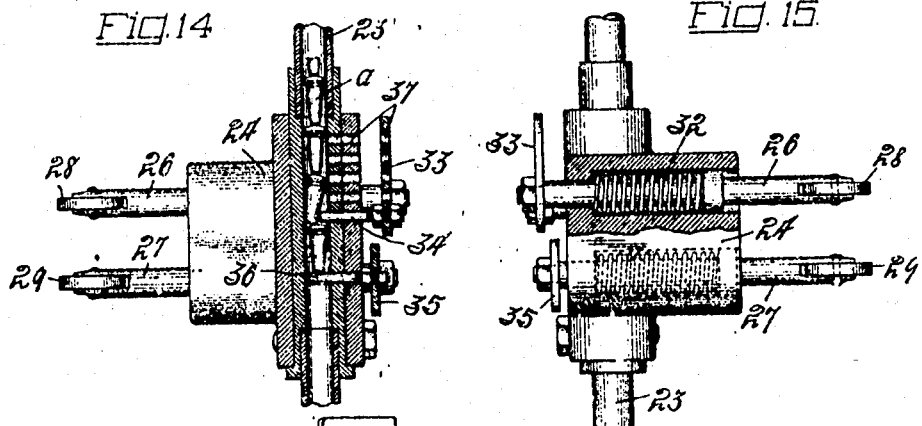

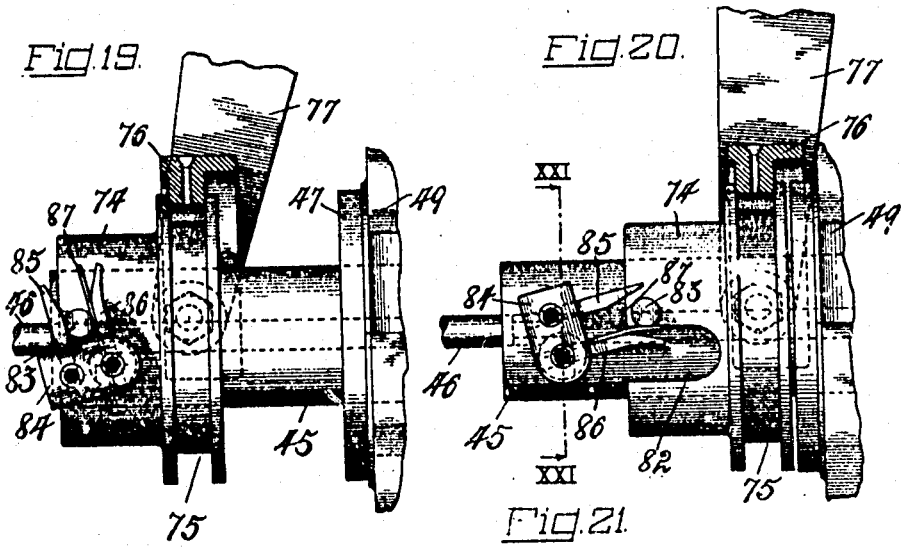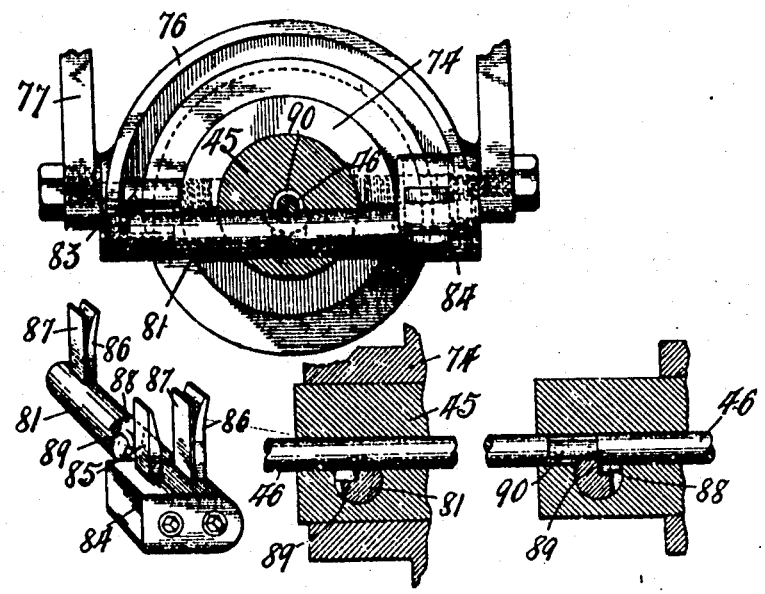

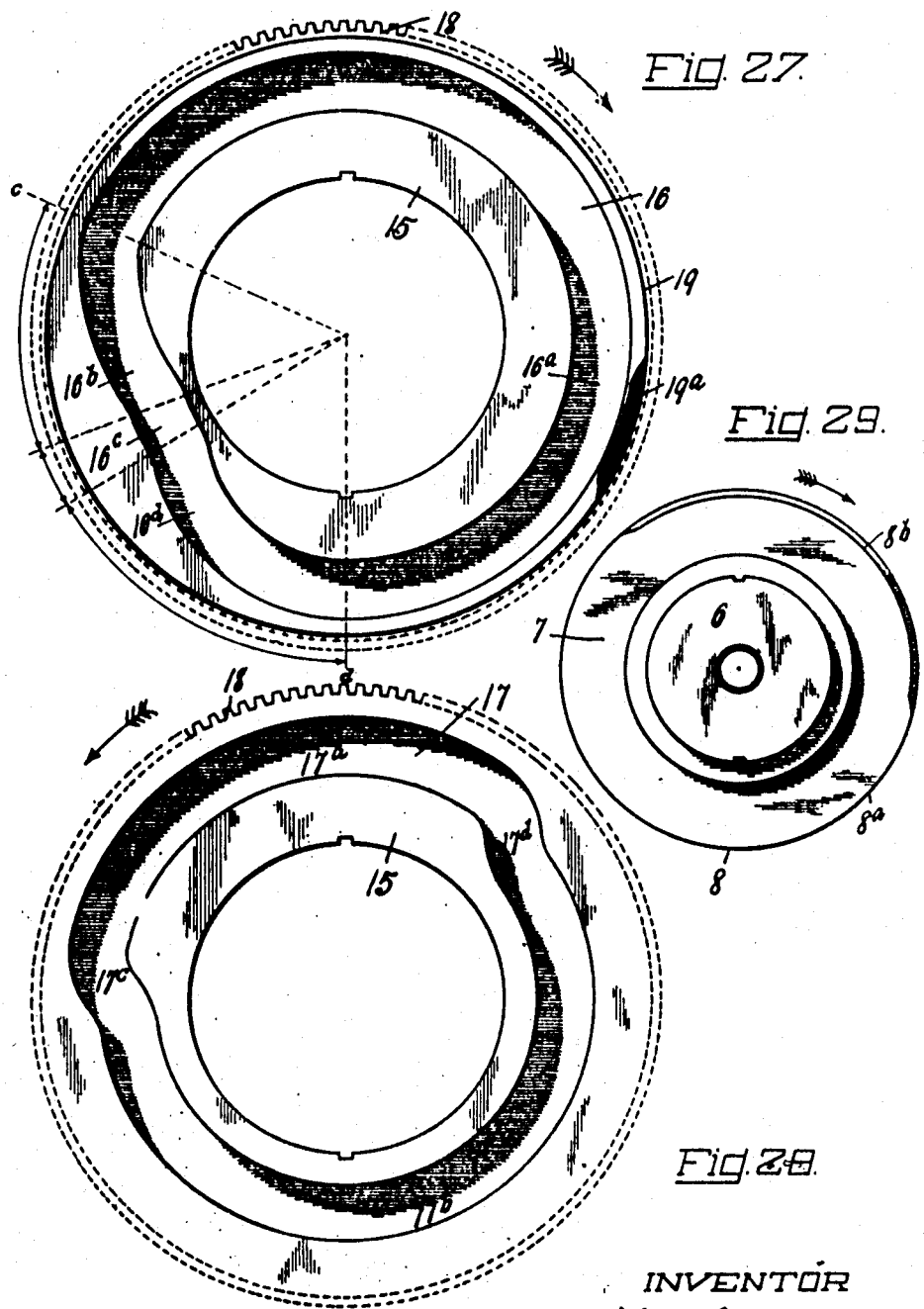

W. E. BOCK.
ARTICLE GRINDING MACHINE.
APPLICATION FILED MAR. 19, 1917.

1,310,386.

Patented July 15, 1919.
15 SHEETS—SHEET 15.

INVENTOR
William Emil Bock.
By Owen, Owen & Crampton,
His attys.

UNITED STATES PATENT OFFICE.

WILLIAM EMIL BOCK, OF TOLEDO, OHIO, ASSIGNOR TO THE BOCK BEARING COMPANY, (INCORPORATED IN OHIO IN MARCH, 1916.)

ARTICLE-GRINDING MACHINE.

1,310,386.   Specification of Letters Patent.   Patented July 15, 1919.

Continuation of application Serial No. 64,447, filed December 1, 1915. This application filed March 19, 1917. Serial No. 155,959.

*To all whom it may concern:*

Be it known that I, WILLIAM EMIL BOCK, a citizen of the United States, and a resident of Toledo, in the county of Lucas and State of Ohio, have invented a certain new and useful Article-Grinding Machine; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to work shaping machines and particularly to a machine especially designed and adapted for truing up and grinding the surfaces of roller bearings.

The primary object of my invention is the provision of an automatic machine of the character described, which is simple and efficient in its construction and operation, and operable in a quick and efficient manner to successively feed bearings to the grinding mechanism, grind them and then discharge them, thereby enhancing the practicability and commercial value of machines of this character.

A further object of my invention is the provision of simple and efficient mechanism for intermittently feeding bearings or other articles to grinding position and holding each article firmly in such position during the grinding operation.

A further object of my invention is the provision of simple and efficient automatic means for coöperating with the article feeding and holding mechanism to center each article preparatory to being ground.

A further object of the invention is the provision of simple and automatically operating means for cleaning the article centering means of accumulated emery dust or other matter prior to each centering operation.

A further object of my invention is the provision of means which is automatically operable to effect a relative movement of each article after being centered and of the grinding medium to grinding relation, and vice versa when the grinding has been performed.

Further objects and advantages of the invention will be apparent to persons skilled in the art from the following detailed description.

While the invention in its broader aspect is capable of embodiment in numerous forms, a preferred embodiment only thereof is illustrated in the accompanying drawings, in which,—

Figure 25:
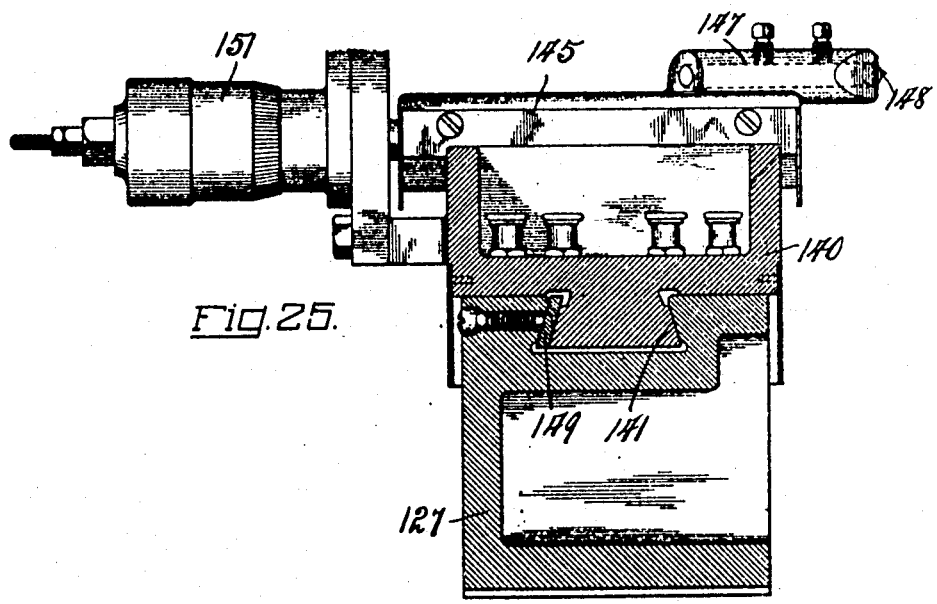
Figure 26:
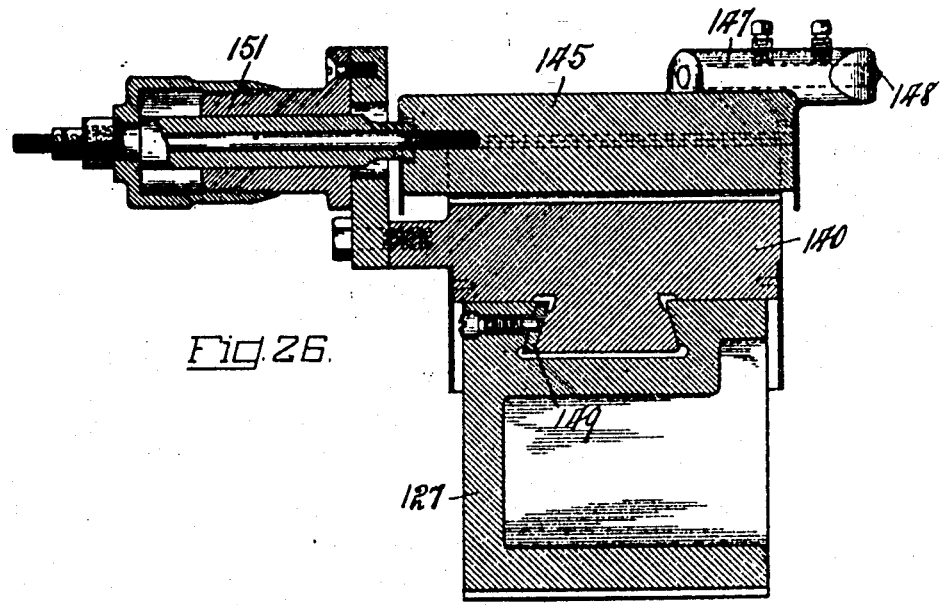
Figure 30:
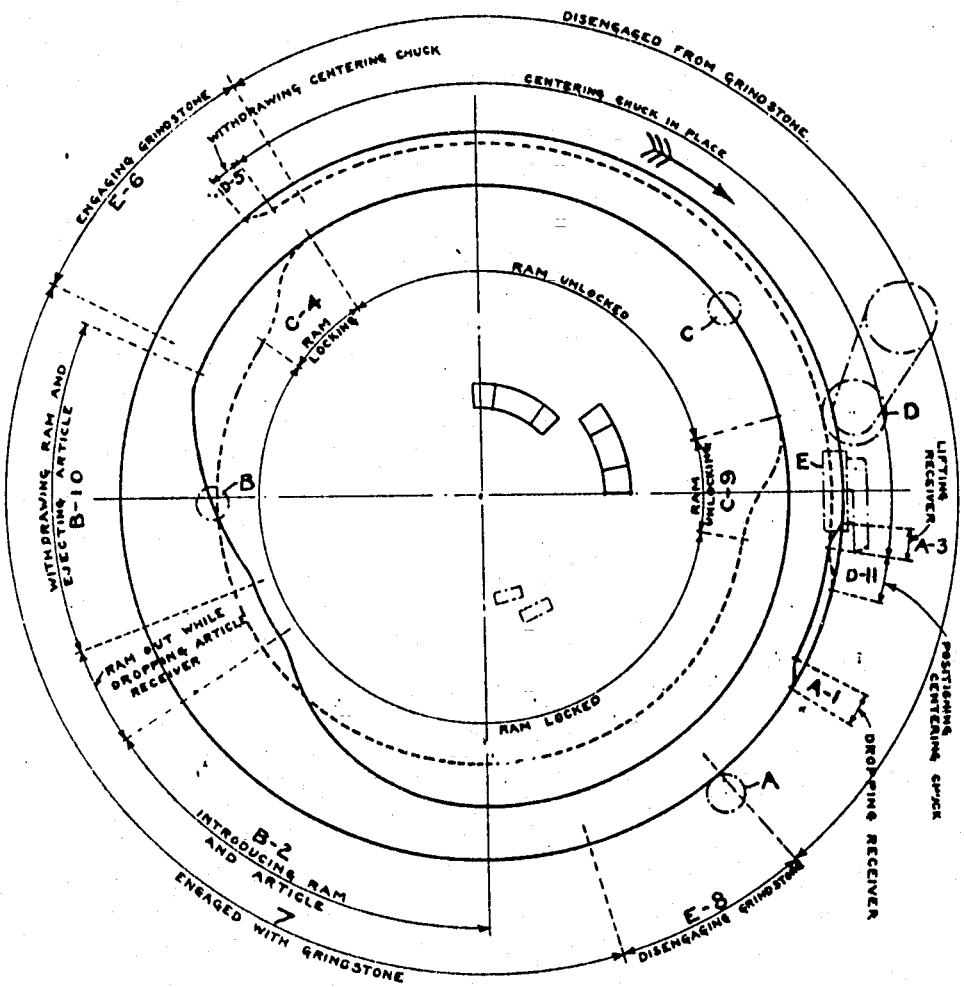

Figures 1 and 2 are front and rear side elevations, respectively, of a machine embodying the invention with portions broken away. Fig. 3 is an enlarged front side view of the left end portion of the machine with parts broken away and in section and with the base portion of the frame removed. Fig. 4 is an enlarged front side view of the right end portion of the machine with parts broken away and in section and with the base frame removed. Fig. 5 is an enlarged sectional view of the bearing alining plunger and associated parts. Fig. 6 is a top plan view of the right end portion of the operative parts of the machine with portions broken away. Fig. 7 is an enlarged section on the line 7, 7 in Fig. 4. Figs. 8 and 9 are enlarged sections on the lines 8, 8 and 9, 9 respectively, in Fig. 3, with parts in full. Figs. 10 and 11 are top plan and front side elevations of the grinding wheel trimming mechanism, with parts broken away and in section and including portions of the bearing ejecting and chuck cleaning mechanisms. Fig. 12 is an enlarged sectional view of the bearing rotating arbor and its carriage with a bearing held in grinding position. Fig. 13 is a broken sectional view of the portion of the arbor and its driving mechanism different from that shown in Fig. 12. Figs. 14 and 15 are different sectional views of the control means for the bearing associated with the feed magazine. Figs. 16, 17 and 18 are different views of the means which receives the bearings from the magazine and moves them to arbor introducing position. Figs. 19 and 20 are elevations of the ram locking clutch mechanism with parts broken away and with the former in released and the latter in locked position. Fig. 21 is a section on the line 21, 21 in Fig. 20, with parts in full. Fig. 22 is a perspective view of the rocker ram locking member of the clutch. Figs. 23 and 24 are sectional details of portions of the clutch mechanism with the ram engaging part in ram released and ram locking positions, respectively. Figs. 25 and 26 are enlarged sectional views of the trimmer mechanism taken respectively on the lines 25, 25 and 26, 26 in Fig. 11. Figs. 27 and 28 are side views of the front and rear sides of the cam ring. Fig. 29 is an inner end view of the cam drum, and Fig. 30 is a diagrammatical view of the operating cams illustrating the order in which the operating parts are brought into play during a cycle of operations of the machine.

This application is filed as a continuation of applicant's prior application Serial No. 64,447, filed December 1, 1915.

In order that the detailed description of the machine embodying my invention may be more readily understood, a general description of the same, in which the parts are not referred to by reference characters, will first be given, and particular attention in this connection is directed to Figs. 1, 2, 3 and 4.

The machine which I have illustrated is particularly adapted for grinding roller bearings, which bearings in the present instance are formed with conical body portions and at the large ends thereof with heads or enlargements. A quantity of these bearings, which may be renewed or added to at any time, are placed in a magazine and automatically fed one at a time in properly timed order to a receiver member, which, at a predetermined point in a cycle of operations, is moved into bearing delivery position, which position it maintains until the bearing has been delivered therefrom. While the said receiver means is in this position a bearing-placing and holding ram is advanced through the receiver and introduces the bearing into the axial bore of a rapidly rotating arbor alining therewith. The ram continues its movement through the arbor until it has forced the enlarged head portion of the bearing against an inturned flange or restricted portion at the far end of the arbor, with the body portion of the bearing, which is the part to be ground, projecting without the arbor end. As the bearing body emerges from the arbor end it enters a registering centering chuck in the inner end of an alinement plunger, which afterward recedes from the bearing preparatory to the grinding operation. When the ram has moved the bearing to grinding position it has an additional clamping or bearing holding force applied thereto and is locked against releasing the bearing during the grinding operation by a suitable clutch mechanism, which is automatically brought into play at this stage in the operation. The arbor and coöperating bearing holding parts are now moved into position to place the body portion of the held bearing into peripheral grinding contact with an emery wheel or other suitable grinding medium, thus effecting a grinding of the conical or tapered portion of the bearing.

Upon the completion of the grinding operation the arbor and associated parts are retracted from grinding position, the clutch mechanism is released from locking engagement with the bearing introducing and holding ram, and the ram is then withdrawn from the arbor and returned to its original inoperative position preparatory to introducing another bearing into the arbor at the next cycle of operations. As the bearing introducing ram recedes the alining chuck advances toward the arbor, air under pressure is ejected through the alining chuck and into the arbor bore to clean the same of any emery dust or other matter which may have collected therein, and an ejecting ram then advances through the arbor from the bearing holding end thereof and ejects the ground bearing therefrom through the end of the arbor at which it was introduced. As the bearing leaves the introducing end of the arbor it drops into a suitable receiving receptacle provided therefor. The ejector ram recedes from within the arbor at the next bearing introducing movement of the introducing ram, the two rams, in the present instance, being connected to and moved in unison by the same operating mechanism. A suitable mechanism for trimming the working face of the grinding wheel is provided and, in the present instance, is manually operable whenever desired to effect a trimming of the grinding wheel.

Referring now more particularly to the detailed description of the machine, 1 designates the base frame which is elongated in form and has a frame part or bearing standard 2 mounted on the top of the left end portion thereof for horizontal swinging movements relative thereto to permit an adjustment of the standard 2 relative to the base frame for the purpose hereinafter described. The standard 2 is pivoted at its inner or forward end to the top of the base frame 1, the pivoted means, in the present instance, comprising a stud 3, which rises from the top of the base frame and enters an opening provided in a boss 4 projecting from the inner end of the standard, as shown in Figs. 1, 3, 4 and 7.

A stud-shaft 5 is mounted in the upper portion of the standard 2, and the stub end of this shaft projects from the rear side of the standard and has the hub portion 6 of a drum 7 mounted for free turning movements thereon, as best shown in Fig. 9, said hub portion projecting toward the standard 2 from the inner edge with a peripheral flange 8, which varies in depth throughout its length to form a cam surface on which a roller (hereinafter referred to) travels, whereby a rotating of the drum with respect to the roller will cause the roller to have inward and outward movements with respect to the drum axis in accordance with the formation of the cam flange 8. The flange 8 also varies in width and cooperates with a ring or band 9, that is mounted on the outer edge portion of the drum periphery, to form a cam race-way 10, which extends entirely around the periphery of the drum, and has one portion thereof offset axially of the drum from the other portion for the purpose hereinafter described.

It is preferable to mount the ring or band 9 on the drum periphery in a manner to permit a transverse adjusting thereof with respect to the cam flange 8 to permit a varying of the width of the cam-way 10 to compensate for wear on the side walls of the cam way. For this purpose a ring 11 is removably secured to the outer edge of the drum 7 by screws 12 and has its outer edge extending radially without the periphery of the drum and approximately to the outer peripheral edge of the ring 9. The ring 11 is provided at suitable spaced points therearound with pairs of screws 13, 14, the former of which passes loosely through the ring 11 and threads into the ring 9, while the latter threads through the ring 11 and bears at its inner end against the outer edge of the ring 9. It is apparent that an adjusting of these screws will effect an adjustment of the ring 9 relative to the drum, and will also lock the ring in such adjusted position.

A wheel or ring member 15 is mounted on the inner end of the drum hub 6 for turning movements therewith and is provided in the front and rear faces thereof with cam-ways 16 and 17, respectively, which extend entirely around the wheel. The member 15 also has its periphery provided with an annular series of teeth forming a spur-gear 18 and at one side of said teeth with a peripheral cam surface 19.

A shaft 20 is mounted in the standard 2 at the rear end thereof and carries a pinion 21 at one end in driving engagement with the gear 18 and at its other end carries a pulley 22, which may be belted to any convenient driving means, or the drum 7 and parts rotating therewith may be driven in any other suitable or convenient manner.

A magazine for containing a plurality of articles to be operated on, bearings in the present instance, is carried by the standard 2 and comprises a tube 23, which is disposed on an incline to permit bearings placed therein to feed by gravity downward therethrough and has its upper end disposed in convenient position for supplying bearings thereto. The tube 23, in the present instance, is carried by a casting or block member 24, which is mounted on a stud 25, projecting from the front side of the standard 2, said member being disposed intermediate the ends of the tube and preferably adjacent to its lower or discharge end. Projecting through the member 24 transversely of the tube and through the standard 2 are a pair of plungers 26 and 27, which are respectively provided at their inner ends with rollers 28 and 29. Cam projections 30 and 31 are provided in the inner or front end of the drum hub 6 in position to respectively conect with the plunger rolls 28 and 29 at predetermined points in a rotation of said hub, thereby imparting properly timed outward movements to the respective plungers. Each plunger 26, 27 is yieldingly held in cam engaging position by a coiled compression spring 32, which is mounted thereon within the member 24 and has its opposite ends thrust against said member and a collar on the plunger, as shown in Fig. 15. The outer end of the plunger 26 is provided with an arm 33, which carries an inwardly projecting pin 34 that extends through a registering opening in the member 24 and enters the bearing feeding passage of the magazine, as shown in Fig. 14. When the plunger 26 is in its normal position the finger 34 projects within the magazine passage in position to obstruct the passage of bearings therethrough, and upon an outward movement of the plunger, when its roller 28 is struck by the cam 30, the pin is withdrawn from bearing obstructing position. The plunger 27 is provided at its outer end with an arm or plate 35 having a finger 36 projecting inward therefrom through a registering opening in the member 24 and into the magazine passage at a point below the finger 34, the space between the two fingers being sufficient to accommodate the length of a bearing, which bearings are designated $a$.

When the plunger 27 is tripped by an engagement of the cam 31 therewith the finger 36 is momentarily retracted from bearing obstructing position and permits the bearing, which is disposed between the two fingers, to pass down through the magazine and into the receiver member of the machine. The tripping of the two plungers 26, 27 by the cams 30 and 31 is so relatively timed that the plunger 27 will first be dropped to release the lowermost bearing $a$, and after said plunger has returned to its normal position, the plunger 26 is tripped to release the supported column of bearings within the magazine and to permit such column to advance the length of one bearing, or until the lowermost bearing of the column has moved into stop contact with the lower stop finger 36; the plunger 26 then returns to normal position to support all except the lower bearing of the column preparatory to the next bearing dropping movement of the finger 36.

The finger 34 may be adjusted lengthwise of the magazine with respect to the finger 36, to accommodate bearings of different lengths, by placing the finger 34 in any one of the sets of openings 37 provided therefor in the arm 33 and member 24.

The receiver means, into which the bearings are successively delivered by the magazine 23, comprises a lever 38 that is pivotally mounted on a stud 39 (Figs. 7 and 9), which projects from the forward or right end of the standard 2 lengthwise of the machine and adjacent to the lower edge plane of the gear ring 15. The lever 38 projects transversely of the machine and is provided at its inner end with a roller A, the axis of which is transverse to the rocking axis of the lever, and which bears upward against the cam surface 19 of the gear ring 15 by reason of the greater weight of the outer end of said lever. The lever 38 is provided at its outer end with a pair of jaws 40 that are respectively pivoted to the lever, as at 41, to have opposed opening and closing movements, the jaws being normally retained in closed position by the action of respective springs 42 thereon, which springs are carried by the pivots 41. The jaws 40 coöperate to form a bearing receiving opening or passage 43, which extends transversely of the lever and registers with the discharge end of the magazine 23 when a bearing is discharged therefrom. At a predetermined point in a rotation of the gear ring 15 the roller A enters a depressed portion 19$^a$ (Figs. 1, 3 and 7) in the cam surface 19, and permits a lowering of the outer end of the lever 38 into position to place the bearing receiving passage 43 thereof into alinement with an axial passage 44 provided in an arbor 45. When the bearing carrying end of the receiver means has been lowered into this position, which is its delivery position, the bearing carried thereby is discharged therefrom and introduced into the arbor passage 44 by the forward movement of a ram 46, which movement of the ram, in the present instance, is lengthwise of the machine from left to right thereof. The lever 38 is provided at its outer end with a transversely projecting finger 38$^a$, which, when the lever is lowered, coacts with a registering block or boss 2$^a$ on the bearing standard 2 and limits the lowering movement of the lever irrespective of the amount of drop permitted by the depression 19$^a$ in the cam surface 19.

The arbor 45 is rotatably mounted in bearing bushings 47, 48, which in turn, are mounted in openings provided in the left and right sides, respectively, of a carriage frame 49. The arbor receiving opening in the bushing 48 is preferably conically enlarged at its outer end, as at 50, to receive the respective conically enlarged end portion of the arbor 45, whereby a pressure exerted lengthwise of the arbor toward its left or rear end will maintain the conical end of the arbor in close bearing contact within the conical end portion 50 of the bushing 48, thereby compensating for wear and preventing any lateral play of the conical end porton of the arbor within the bushing, or in other words, permanently maintaining the outer end of the arbor passage 44 in centered relation to the bearing. A belt pulley 51 is keyed to the arbor 45 within the carriage frame 49 and between the bearing bushings 47 and 48 and has a belt 51$^a$ leading therefrom to any suitable source of power whereby rapid rotation is communicated to the arbor. A friction plate 52 of annular form is disposed between the hub of the pulley 51 and the adjacent end of the bushing 48 and is anchored to the pulley to have rotation therewith by one or more pins 53 projecting from the pulley. These pins, however, permit the plate to have free axial movements relative to the pulley (see Fig. 12). A plurality of coiled compression springs 54 are mounted in sockets provided in the hub portion of the pulley 51 lengthwise thereof (see Fig. 13) and have their outer ends thrust against the friction plate 52 and their inner ends thrusts against the bases of the sockets. It is thus apparent that the springs 54 apply opposed thrusts against the inner end of the bushing 48 and the arbor 45, thereby serving to permanently maintain the conical end of the arbor in close bearing and centering contact within the conical portion 50 of said bushing.

A bearing holding nipple 55 is removably mounted in the forward or outer end of the arbor 45 in axial register with and forming a continuation of the passage 44 through the arbor, and this nipple is removably held within the arbor end by a bushing or collar member 56, which threads into an enlarged end portion of the arbor passage, as best shown in Fig. 12. The nipple 55 has outward shouldering contact with the bushing 56 and is removable from such bushing through the inner end thereof. The outer end of the nipple 55 is provided with an inwardly projecting flange 57, which restricts the outlet end of the passage therethrough and forms an abutment against which the flanged or enlarged head portion of a bearing $a$ has outward thrust contact under the action of the ram 46, as hereinafter more fully described.

The carriage 49 is mounted on the shallow forward end portion 2$^b$ of the bearing standard 2 for movements transversely thereof, and is held to the bearing standard and has its movements relative thereto guided by dove-tailed tongue and groove connection, as shown at 58 in Figs. 3 and 4. 59 designates a tapered bar which is disposed between the tongue and groove connection 58 at one side thereof and is capable of adjustment lengthwise of said connection to take up any wear occurring therein, as is well understood in the machine art.

The ram 46 is loosely and rotatably carried at its rear end by an arm 60, which projects upward from a bar 61 that extends the entire length of the machine and is mounted at its rear end in suitable bearings provided in the lower base portion of the bearing standard 2 for reciprocatory movements lengthwise of the machine. The other end of the bar 61 is mounted in suitable bearings provided in the forward or right hand end portion of the machine, as hereinafter described. The ram 46 is carried by the arm 60 in axial register with the passage 44 through the arbor 45 and is supported in advance of the arm 60 or between said arm and the adjacent end of the arbor 45 by a bearing arm 69, which projects to the left and then upward from the adjacent side of the arbor carriage 49. The ram supporting or guiding portion of the ram 46 is spaced from the rear end of the arbor 45 a suitable distance to permit a lowering of the bearing receiving jaws 40, 40 therebetween, and the ram, when at the limit of its rearward movement, stands at the rear of the bearing receiving jaws 40, 40 so as not to obstruct the lowering movement of such jaws into bearing delivery position.

The means employed for controlling the movements of the ram 46 and bar 61, to which it is attached, will now be described. A shaft 63 (Fig. 8) is mounted for rocking movements in the rear end portion of the bearing standard 2 and carries a roller B at one side thereof and within the cam raceway 16 of the rotatable member 15, while the downwardly projecting arm of said lever is provided at its lower end with a segmental rack 65, which meshes with and when rocked imparts rotary reciprocatory movements to a pinion 66 and the shaft 67 on which it is mounted. The shaft 67 is mounted in a suitable bearing 68 provided in the base portion of the bearing standard 2 adjacent to the left hand end thereof. Keyed to the forward end of the shaft 67 is an upwardly projecting rocker arm 69, the upper end of which has connection through a bar or link member 70 with the base portion 60° of the bracket arm 60 from which the ram 46 projects. It is thus evident that a rocking of the arm 69 will communicate reciprocatory movements to the bracket arm 60 and bar 61 by which it is carried. The base portion 60° of the bracket arm 60 carries a roller 71 at one side thereof, which roller travels in the channel of a horizontally disposed guide-bar 72 and coacts with said guide bar to relieve the bar 61 of lateral pressure which might otherwise be imparted thereto by reason of the angle of thrust of the link 70 with respect to the plane of movement of the bar 61. The guide-bar 72 is carried by suitable brackets 73, which are fixedly secured to and rise from the base portion of the bearing standard or frame part 2.

The cam way 16 is of true circular form, in the present instance, for nearly three-quarters of its length, as indicated at 16ª, thence is provided with an inwardly projecting cam portion 16ᵇ leading to a short neutral portion 16ᶜ (from which the cam-way extends gradually outward, as at 16ᵈ, to the adjacent end of the prolonged neutral portion 16ᵉ, the cam portion of the groove, in the present instance, extending between the lines c, d. The drum 7 and cam-ring 15 turn in clockwise direction, as indicated by arrows in Figs. 3 and 27, so that the cam roller B travels in counter-clockwise direction, in the groove 16 and upon leaving the prolonged neutral portion 16ᵉ thereof passes through the reentrant portion 16ᵇ to the short neutral portion 16ᶜ, in which latter position the bar 61 and the ram 46 are at the limits of their rearward or retracting movements. During the short period of rest of the ram 46 and associated parts while the cam roller B is in the neutral portion 16ᶜ of its cam way, the bearing receiving jaws 40, 40 lower into position for the bearing receiving opening 43 therein to axially register with the ram 46, such lowering movement of the receiver being due to the cam roller A of the receiver means entering the depressed portion 19ª of the cam surface 19. The receiver means having lowered to delivery position, the cam roller B travels outward through the cam portion 16ᵈ of its cam-way, and the rocking movement which is thus imparted to the lever 64, rotates the shaft 67 in clockwise direction and communicates a full forward stroke to the bar 61 and ram 46. The forward stroke of the ram 46 effects an ejection from the receiver means of the bearing contained therein and forces the bearing through the registering passage 44 of the arbor and with its flanged or enlarged end in contact with the inwardly flanged outer end portion of the arbor nipple 55, in which position the bearing stands with its conical body portion projected beyond the adjacent arbor end in grinding position, as shown in Fig. 12. The roller B enters the prolonged neutral portion 16ᵉ of its groove simultaneous with the moving of the ram into the bearing holding position shown in Fig. 12, and the ram is maintained in such holding position during the travel of the roller B through the entire length of the neutral portion 16ᵉ of its cam way, as is apparent. The movement of the arbor carriage 49 into grinding position, the grinding of the bearing and the return of the carriage to its normal position take place during the travel of the roller B in the neutral portion 16ᵉ of its cam way, and when this is completed the ram 46 and the movable parts associated therewith are retracted to the limits of their rearward movements by the passage of the cam roller B through the neutral portion 16ᵇ of the cam-way.

When the ram 46 has been moved to the bearing clamping position shown in Fig. 12 it is further urged into holding engagement with the bearing and locked in such position by a mechanism which will now be described. Mounted on the rear end portion of the arbor 45 for reciprocatory movements lengthwise thereof is a collar 74, which is provided with a peripheral groove 75 in which a yoke 76, that is carried by the forked end of a shipper lever 77, engages, whereby rocking movements of the lever will impart shifting movements to the collar 74 longitudinally of the arbor and at the same time permit rotation of the collar with the arbor. The lever 77 is fixed to one end of a rock-shaft 78 that is mounted transversely of the machine frame in the outer end of a bearing arm 79, which projects from the forward end of the bearing standard 2 lengthwise of the machine. A rocker-arm 80 projects from the opposite end of the shaft 78 and carries a cam roller C at its free end in position to travel in the cam-way 17 of the member 15, whereby predetermined rocking movements are communicated to the shaft 78 and parts attached thereto at each rotation of the member 15. The cam-way 17, which is best shown in Fig. 28, is provided with the two neutral or concentric portions 17ᵃ and 17ᵇ, the former being outermost, and the respective ends of these portions are connected by the cam portions 17ᶜ and 17ᵈ. When the cam roller C is traveling in the outer neutral portion 17ᵃ the collar 74 is at the limit of its rearward movement or in unlocked position, as shown in Figs. 3 and 19, and when said roller is traveling in the neutral portion 17ᵇ of the cam-way the collar 74 is at the limit of its forward movement, or in bearing locking position, as shown in Fig. 20. The formation of the two cam-ways 16 and 17 and the engaging of the respective rollers B and C therewith are such that the roller C enters the neutral portion 17ᵇ of its cam-way immediately after the ram 46 has been moved to bearing holding position, the roller C remaining in said portion 17ᵇ of its groove until just prior to the rearward movement of the ram 46 from its bearing holding position, thus causing the ram to be locked in rigid bearing holding position during nearly the entire period of travel of the cam roller B in the prolonged neutral portion 16ᵃ of its cam-way.

A ram locking shaft 81 is mounted for rocking movements in the rear end portion of the arbor 45 transversely thereof, and in tangential relation to its axis. The rear end of the collar 74 is recessed at each side thereof in register with the shaft 81, as at 82, to permit a movement of the rear end of the collar 74 to the rear of the shaft 81, as shown in Fig. 19. A stud 83 projects from each of opposite sides of the collar 74 at the rear end thereof, with one above each recess 82, so that these studs have movements over the top or inner side portion of the shaft 81 when the collar 74 is shifted from one position to another. One end of the shaft 81 is provided with a block or enlargement 84, and a pair of fingers 85 and 86 project transversely from this block in position to receive the adjacent stud 83 therebetween. It is evident that upon a movement of the collar 74 from the released or unlocked position shown in Fig. 19 to the locking position thereof shown in Fig. 20, the respective stud 83 will act on the finger 86 to effect a rocking of the shaft 81 in clockwise direction to cause it to have locking engagement with the ram 46, as hereinafter described, while a return movement of the collar will cause the stud 83 to coact with the finger 85 and effect a backward rocking of the shaft 81 to its ram releasing position. The shaft 81 is preferably provided at each end thereof with a finger 86, as a greater strain is exerted on the fingers 86 in moving the shaft 81 and holding it in ram locking position than is applied to the finger 85 in returning the shaft to ram releasing position. The inner surfaces of the fingers 86 at their outer end portions are outwardly rounded and a spring finger 87 projects from the block 84 or shaft 81, as the case may be, at the inner side of the respective finger 86 and to near the outer end thereof, said spring fingers being normally straight instead of following the curved form of the rigid fingers 86. The spring fingers 87 receive the direct locking thrusts of the respective studs 83 and are sufficiently yieldable to permit a stopping of the bearing clamping movement of the ram 46 before the collar 74 has moved the full length of its forward or locking stroke.

The shaft 81 is provided in a side thereof adjacent to the ram 46 with a recess 88 through which the ram 46 projects, said recess having a radially projecting shoulder 89, which, when the shaft is turned to the locking position shown in Figs. 20 and 24, enters a registering annular groove 90 in the ram and coacts with the forward end wall thereof to force the ram against the bearing *a* which it is holding. It will be understood that the rocking movement of the shaft shoulder 89, when moving into locking and holding engagement with the forward end wall of the ram recess 90, is in the direction in which the ram 46 is exerting pressure against the bearing *a*, thereby causing the locking movement of the shaft to exert an additional bearing holding pressure on the ram. When the shaft 81 has turned as far as the movement of the ram 46 will permit the spring fingers 87, with which the actuating studs 83 have contact, yield to compensate for the difference in movement between the actuating collar 74 and the shaft 81. The unlocked and locked positions of the shaft 81 relative to the ram 46 are illustrated in Figs. 23 and 24, which correspond to the positions of the parts shown in Figs. 19 and 20, respectively.

An arm 91 projects from the top portion of the arbor carriage 49 toward the right end of the machine and is provided at the under side of its outer end with a bearing head 92 in which a sleeve 93 is mounted for rotary movements and for reciprocatory movements in axial alinement with the arbor passage 44. The sleeve 93 has its forward end headed or enlarged without the bearing 92 and provided with a peripheral groove in which a collar 94 loosely engages, said collar being connected by a forked yoke 95 to the forward end of a rod or link member 96. The rear end of the rod 96 is pivotally attached to the end of a rocker arm 97, which is carried by and projects downward from a rock shaft 98 that is mounted transversely of the machine in a bearing part 99 that projects upward from the free end of the bearing arm 79. The shaft 98 is provided with a rocker arm 100 which carries a roller D in position to bear rearwardly against the front edge of the cam flange 8 on the inner edge portion of the cam drum 7. The flange 8 is provided with the two connected concentric portions 8$^a$ and 8$^b$ the latter of which is of shorter radius than the former, as shown in Fig. 29. It is evident that a radial movement of the roller D in passing from one concentric portion to the other of the cam 8 will impart a rocking movement to the shaft 98, which in turn will communicate an inward or outward stroke to the sleeve 93, depending on the direction of rocking of the shaft.

A coiled contractile spring 101 extends rearward from each fork arm of the yoke 95 and is anchored at its opposite end to a boss 102 projecting from the adjacent side of the frame arm 91. It is thus evident that the springs 101 exert a constant rearward pull on the sleeve 93 and are the means for imparting an inward stroke to said sleeve.

A plunger 103 is mounted within the sleeve 93 for movements lengthwise thereof and has one end terminating within the enlarged forward end portion of the sleeve 93 and receiving at such end the rearward thrust of a coiled compression spring 104 that is mounted in the enlarged end portion of said sleeve. The outer end thrust of the spring 104 is against a cap 105 that is removably mounted on the forward end portion of the sleeve 93, while the inner end thrust of the spring is against an end thrust bearing 106 that is disposed between the spring and adjacent end of the plunger 103. The plunger 103 projects at its rear end without the sleeve 93 and carries a bearing centering chuck 107 at such end in axial alinement with the arbor passage. When the plunger 103 is at the limit of its inward or rearward stroke the centering chuck 107 stands adjacent to the outer end of the bearing holding nipple 55 of the arbor in position for the conical end of a bearing $a$ to enter the chuck and be centered or axially alined thereby with respect to the arbor axis as it is projected from the arbor end.

The spring 104 permits the plunger 103 to have a yielding outward movement as the bearing enters the chuck 107, thereby insuring an accurate centering of the bearing with respect to the arbor axis. When the bearing has been centered by the chuck 107 the cam roller D passes from the inner to the outer concentric portion of its cam-way and communicates an outward movement to the sleeve 93 and plunger 103 to retract the latter from the centered bearing preparatory to the grinding operation. The inner and outer concentric surfaces 8$^a$ and 8$^b$ of the cam 8 are so proportioned and arranged with respect to the movements of the ram 46 that the cam roller D passes from the outer to the inner concentric portion of its cam-way and moves the centering chuck 107 to bearing centering position at approximately the time at which the ram 46 begins its rearward or retracting movement from bearing holding position, and the plunger 103 then retains its bearing centering position until a bearing has been moved into centering contact therewith and the ram locked in bearing holding position, after which the cam roller D passes to the outer concentric portion of its cam and retracts the centering plunger from centering position.

Shortly after the centering plunger 103 has been retracted from bearing centering position the arbor carriage 49 is moved transversely of the machine into position for the conical body portion of the bearing $a$ to have engagement with the periphery of a grinding wheel 108, which is mounted on a shaft that is journaled lengthwise of the machine in bearing standards 110, which rise from a table 111. This table is mounted on the top of the base frame 1 at the rear side thereof for adjusting movements transversely of the frame, being suitably guided for such purpose by the base frame. The table 111 has a boss 112 projecting downward from the bottom thereof within the base frame, and an adjusting shaft 113 is mounted in the base frame transversely thereof and threaded through the boss 112, whereby a turning of said shaft will effect an adjusting of said table. The shaft 113 is provided at the front side of the machine with a hand wheel 114. Mounted on the shaft with the grindstone 108, and, in the present instance, between the two bearings 110, is a stepped pulley 115 from which a belt 116 leads to any suitable source of power, thereby causing a very rapid driving of the grinding wheel.

A rod 117 projects forward from the front side of the portion 2ᵇ of the bearing standard 2 on which the arbor carriage 49 is mounted and extends through a registering opening in a plate or flange 118, which depends from the outer forward end of the arbor carriage as shown in Figs. 1 and 7. A coiled compression spring 119 is mounted on the rod 117 between the outer side of the plate 118 and a nut 120, that is threaded on the outer end of the rod, and exerts a rearward pressure of considerable force on the forward end of the arbor carriage, such pressure being adjusted or varied by an adjusting of the nut 120 on the rod, as is apparent. The rear end of the arbor carriage 49 is provided, in the present instance, with two vertically alined thrust parts 121 and 122, which in the present instance, comprise studs that thread into the rear end of the arbor carriage lengthwise of its movement, as best shown in Fig. 7. These studs or thrust parts are intended to have thrust contact with registering portions of a lever 123, which is pivotally attached to and rises from a rearwardly projecting boss 2ᶜ on the rear side of the part 2ᵇ of the bearing standard. The upper end of the lever 123 carries a cam roller E which travels in the camway 10 of the drum 7. The purpose of providing the two thrust parts 121 and 122 for engagement with the lever 123 is to cause said parts to successively coact with the lever upon a rocking thereof, one or the other being always in contact with the lever, thereby preventing the jar or shock which might be occasioned if only one thrust part were provided and the lever moved into and out of engagement therewith. In other words, a fine adjustment and more perfect action is provided by the provision of the two thrust parts than would be the case if only one was present. It will be understood, however, that this is a detail of construction that may be varied or changed as desired.

The rocking movements of the lever 123 control the shifting movements of the arbor carriage 49, and the movements of such lever are in turn controlled by the formation of the camway 10, which camway for such purpose is provided with the connected axially offset portions 10ᵃ and 10ᵇ. These camway portions are so proportioned and arranged with respect to the cycle of operations of the machine that the cam roller E will leave the portion 10ᵃ and enter the portion 10ᵇ shortly after a bearing has been delivered to the forward end of the arbor and centered therein, thereby permitting a rearward movement of the arbor carriage 49 under the action of the spring 119 to place the bearing that is carried by the arbor into grinding contact with the grinding wheel. The bearing is maintained in grinding position during very nearly one-half of a rotation of the drum 7 by reason of the cam roller traveling in the portion 10ᵇ of the camway, after which the cam roller reënters the portion 10ᵃ and forces the arbor carriage 49 to its normal bearing receiving and discharging position, such movement of carriage taking place a short distance before the cam 46 begins its retracting movement by reason of its control roller B entering the reëntrant portion 16ᵇ of its camway. The speed of movement of the arbor carriage 49 toward and away from the grinding wheel is varied between the beginning and the ending of each stroke thereof due to the differential spacing of the thrust parts 121 and 122 with respect to the rocking axis of the lever 123, the thrust part 122 being last brought into contact with the lever during a forward or grinding-stone engaging movement of the carriage and thereby effecting a material slowing down of the carriage movement as it nears the limit of its forward stroke.

When the arbor carriage has returned to its normal or bearing receiving position after the grinding operation, the ram 46 is retracted from the arbor and the ground bearing is simultaneously ejected from the arbor through the rear end thereof by an ejector rod 124 which works axially through the centering plunger 103. This ejector rod is fixedly attached at its forward or outer end to an arm 125 which projects upward from the forward end of the reciprocatory bar 61, which end portion of the bar is mounted for reciprocatory movements in a bearing bracket 126. The bearing bracket 126 is bolted, in the present instance, to the top of a frame part 127 that is mounted on the right end portion of the base frame 1, and said bracket is adapted to have transverse arcuate adjustment with respect to the machine by reason of the holding bolts 128 passing through arcuate slots 129 in the respective portions of the bearing bracket, as shown in Fig. 10. The arcs of the slots 129 are struck from the pivot stud 3 or axis of transverse adjustment of the bearing standard 2, thereby permitting an adjustment of the bearing bracket in accordance with an adjustment of the bearing standard.

It is apparent that the reciprocatory movements of the ram 46 and ejector rod 124 are in unison, inasmuch as both are connected to and movable with the bar 61.

Upon a rearward movement of the ejector rod 124 it engages the forward end of the ground bearing a and forces it rearward through the arbor passage and without the rear end thereof, the bearing being permitted to fall into a receptacle or receiving means provided for that purpose. The spacing between the adjacent ends of the ram 46 and ejector rod is sufficient to permit a lowering of the bearing receiving jaws 40 therebetween when the parts are at the limit of their rearward movements.

The ejector rod 124 is in the form of a tube, having a passage provided lengthwise therethrough, and its rear end is connected through a flexible hose 130 with a suitable source of air under pressure. A rotary valve 131 is provided at the end of the rod or tube 124 to which the hose connects and has an arm 132 (Fig. 10) projecting transversely from an end thereof in position to engage a trip finger 133 at a predetermined point in a bearing ejecting movement of the rod 124. The valve arm 132 has a coiled contractile spring 134 projecting therefrom toward the left end of the machine and anchored at its left end to the upper end of the bearing arm 125. This spring yieldingly retains the valve arm 132 in its closed position or in contact with a stop 135. The trip finger 133 is pivoted for horizontal movements to the upper end of a bracket arm 136, as at 137, and has shouldered contact against a registering part of the bracket arm, as at 138, to limit its pivotal movements in one direction. A coiled contractile spring 139 connects the finger 133 to a part of the bearing bracket 136 and yieldingly retains the finger in stop shouldered contact with the bracket arm, or in other words, normally retains the nose portion of the trip finger in the path of movement of the valve arm 132. When the valve arm is moved forward or to the right past the trip finger 133, said finger is forced back on its pivot out of the path of movement of the finger. It is evident, however, that upon a movement of the valve arm 132 in the opposite direction from the limit of its forward movement the nose portion of the trip finger 133 will coact with and cause a valve opening movement of the arm 132 against the tension of its spring 134. When the valve arm has passed from engagement with the trip finger, the spring 134 will return it to valve closing position. The opening contact of the valve arm 132 with the trip finger 133 is timed to take place immediately or very shortly after the ejector rod 124 has begun its bearing ejecting stroke, so that the valve 131 will be opened and air under pressure discharged through the ejector rod and into the centering chuck 107 to clean such chuck of any emery dust or other matter which may have lodged therein during the grinding operation. The discharged air also plays against the ground bearing to clean it of accumulated emery dust or other loose matter and tends to force the bearing back into the arbor passage.

A carriage 140 is mounted on the rear or left end portion of the frame part 127 for reciprocatory movements lengthwise of the frame and is guided for such movements, in the present instance, by a dove-tail tongue and groove connection 141 with the frame part 127, as shown in Figs. 25 and 26. A shaft 142 is journaled lengthwise of the frame in a bearing arm 143 at the forward end of the frame part 127 and has its rear end threaded through a registering portion of the carriage 140 whereby a turning of the shaft will effect an adjustment of the carriage lengthwise of the machine. A hand wheel 144 is mounted on the outer end of the shaft 142 to facilitate a turning thereof.

A plate or block 145 is mounted on the rear end portion of the carriage 140 for reciprocatory movements transversely of the direction of movement of said carriage and for such purpose is shown, in the present instance, as having dove-tail tongue and groove connection with the carriage 140, as shown at 146, Fig. 11. The block 145 is provided at its rear end with a rearwardly extending boss 147 having a socket in its outer or rear end for receiving and holding a diamond or other suitable trimmer point 148 for trimming the working face of the grinding wheel 108. The block 145 is adjustable toward and away from the grinding wheel 108 transversely of its axis to place the trimmer point into or out of trimming contact with the grinding wheel periphery, and the carriage 140 is adjustable in parallel relation to the working face of the grinding wheel to effect a movement of the trimmer point across said face. The block 145 and its trimmer point are disposed below the rear end portion of the bearing centering plunger 103 so that the grinding wheel is engaged by the trimmer means below the plane of engagement of a bearing therewith, as shown in Figs. 1 and 4.

149 and 150 designate tapered bars which coact with the dove-tail connections 141 and 146, respectively, and are adjustable to take up wear between the dove-tail parts of said connections as well understood in the art.

The adjustment of the trimmer point carrying block 145 with respect to the carriage 140 is preferably affected by a micrometer adjusting means 151 (see Fig. 26). As the specific construction of this means forms no part of the present invention and the operation thereof is well understood by persons skilled in the art, it will not be described in detail.

A swinging adjustment of the bearing standard 2 with respect to the base frame 1 and about the pivot stud 3 of said standard is effected by a turning in one direction or the other of a pair of screws 152 and 153 (Figs. 2 and 3), which screws thread into opposite ends of a block 154 secured on the top of the left end portion of the base frame 1, with one screw bearing against the front side and the other screw bearing against the rear side of a flange 155 projecting lengthwise of the frame from the rear end of the bearing standard 2 at the lower edge thereof. A set-screw 156 (Fig. 3) is threaded through a part of the block 154 and coacts with a portion of the flange 155 to lock the bearing standard in adjusted position. The purpose of adjusting the bearing standard 2 is to change the inclination of the arbor axis with respect to the grinding wheel axis to suit the shape or taper of the bearing or other article to be ground. The bearing 126, which carries the forward end of the reciprocatory bar 61, is also adjustable as hereinbefore described to suit the adjustment of the standard 2.

The operation of my invention is as follows: When the machine is in operation the bearings *a* are intermittently fed from the delivery end of the magazine 23, one at each cycle of operations, due to the tripping contact of the cam 31 with the magazine plunger 27 at each rotation of the drum hub 6, which movement of the plunger retracts the finger 36 from bearing obstructing position and permits a downward feeding of the lowermost bearing from the magazine, the other bearings being supported by the stop finger 34. As soon as the finger 36 has been tripped to drop its bearing and again returned to its obstructing position within the magazine the cam effects a tripping of the plunger 36 and its finger 34 to permit a lowering of the column of bearings within the magazine until the lower one moves into contact with the stop finger 36, the stop finger 34 then returning to bearing obstructing position. The bearing, which is released from the magazine, is discharged into the receiving passage 43 between the jaws 40, 40 of the bearing receiving means, such delivery of the bearing to the receiver means taking place after the ram 46 is moved forward and before the return stroke thereof. When the ram 46 has returned to the limit of its rearward movement the roller A enters the depressed portion 19ª of the cam-way 19 and permits a dropping of the bearing carrying jaws 40, 40 into position for the passage 43 therein to axially register with the ram 46 and arbor passage 44, such movement of the bearing receiver means taking place while the cam roller B is traveling in the neutral portion 16ᶜ of its cam way. Immediately after the bearing receiver means has been lowered to delivery position the cam roller B passes outward through the cam portion 16ᵈ of its cam way, thereby imparting a forward stroke to the bar 61 and parts carried thereby through the medium of the lever 64, rack and pinion 65, 66, rocker arm 69 and link 70. As the ram 46 makes its forward stroke it enters the bearing receiver means, discharges the bearing therefrom into the arbor passage 44 and moves such bearing to the farther end of the arbor with its head in abutment with the restricted end of the arbor passage and with its body portion projected beyond the arbor end into grinding position. Shortly after the bearing has been discharged from the receiver means by the ram such receiver means is elevated to receiving position by reason of the roller A thereof passing outward from the depression 19ª of its cam way. As the outer end of the lever 38 of the receiver means raises from bearing delivery position the jaws 40 open against the tension of the springs 42 to permit the transverse withdrawal thereof from around the ram 46. Immediately after the ram 46 has completed its forward stroke the roller C moves from the outer to the inner concentric portion 17ᵇ of its cam way, thereby rocking the shipper-lever 77 and imparting a forward locking movement to the collar 74 on the rear end of the arbor 45. This movement of the collar 74 effects a forward rocking of the ram locking shaft, and swings the shouldered part 89 of said shaft into the ram groove 90, which at this stage of the operation stands in register with said shaft, and said shoulder 89 ans forward forcing and locking contact with the forward end wall of the ram groove, as best shown in Fig. 24, thus taking up any endwise play which the ram 46 may have by reason of the loose manner in which it is carried by the bearing arm 60, and forcing it into clamping contact with the head of the bearing in opposition to the restricted end of the bearing holding nipple 55. When the body of the bearing *a* is forced from the forward end of the arbor it enters a registering centering chuck 107 in the alining plunger 103, which plunger at this stage of the operation is at the limit of its rearward movement by reason of the control roller D therefor traveling in the inner concentric portion 8ᵇ of its cam way. The forcing of the body portion of the bearing into the chuck 107 causes a centering or alining of the bearing axis with the arbor axis, thus preventing any wabbling of the projecting portion of the bearing about its axis of rotation during the grinding operation. When the bearing has been centered the cam roller D moves from the inner to the outer concentric portion 8ª of its cam way, thereby forcing the sleeve 93 and centering plunger, which is carried thereby, away from the centered bearing to expose the bearing to the grinding wheel.

The centering plunger having been retracted from bearing engaging position, the arbor carriage is moved transversely of the machine into position to place the bearing a, which is carried thereby, in contact with the working face of the grinding wheel 108. This movement of the arbor carriage is caused by the action of the spring 119 against the forward end of the carriage and is permitted by reason of the roller 125 on the control lever 123 passing from the portion 10ª to the portion 10ᵇ of the drum cam way 10. The movement of the arbor carriage is very slight so that the ram 46 and ejector rod 124 are only very slightly distorted from axially alined position, such movement of the ram 46 being permitted by reason of its loose connection with the arm 60 by which it is carried. The arbor remains in grinding position for a little less than half a cycle of movement of the cam parts, as indicated by the diagram in Fig. 30, the disengaging of the bearing from the grinding stone taking place before the cam roller B enters the reëntrant portion 16ᵇ of its cam way and imparts a rearward or retracting stroke to the ram 46 and a bearing ejecting movement to the ejector rod 124. The cam roller D passes from the outer to the inner concentric portion 8ᵇ of its cam way immediately before the cam roller B enters the reëntrant portion 16ᵇ of its cam way, thereby moving the centering plunger 103 rearward before the ram 46 starts on its return or rearward stroke. Immediately after the ejector rod 124 has started on its rearward or bearing ejecting stroke, which takes place simultaneously with the rear stroke of the ram 46, the arm 132 on the air valve 131 has contact with and is moved to open position by the trip finger 133, and when the arm 132 has moved past the trip finger the valve is returned to closed position by the action of the spring 134 thereon. The opening of the valve 131 permits a discharge of air under pressure through the ejector rod 124 and into the centering chuck 107, thus blowing therefrom any emery dust or other matter which may have collected in the chuck during the grinding operation. As the ejector rod 124 continues its rearward movement, after the closing of the air valve, the ground bearing is forced rearward through the arbor and discharged from the rear end thereof. This completes a cycle of operations of the machine, the ram having been returned to the limit of its rearward stroke and in position to discharge another bearing from the receiver means and into the arbor.

The order of operations of the different mechanisms, the action of which are controlled by the drum 7 and ring member 15, is well illustrated in a diagrammatical manner by Fig. 30 of the drawing. For the purpose of this diagrammatical illustration, the cam rollers have been referred to by capital letters, the successive order of which is in accord with the order in which the cam rollers are successively brought into action during a cycle of the machine. The diagram also illustrates numerically and in order the successive operations which take place in a cycle. For instance, disregarding the dropping or feeding of a roller from the magazine to the receiver means, the first operation in the cycle (supposing the ram 46 to be at the limit of its rearward stroke) occurs when the cam roller A enters the depression 19ª in its cam way and permits a lowering of the receiver means to discharging position. This operation is therefore designated A¹ on the diagram. The next operation, namely that of advancing the ram 46 and placing the bearing in grinding position, is accomplished by the movement of the cam roller B outward through the cam portion 16ᵈ of its camway, as indicated by the line B² at the lower left hand portion of the figure. The next operation is the passing of the roller A from the depressed portion 19ª of its camway, which effects a raising of the bearing receiving means into receiving register with the magazine. This operation is designated A³. The fourth operation is the movement of the ram locking means to locking position, being designated C⁴, and occurs when the roller C passes through the inwardly projecting portion 17ᶜ of its camway, said operation being designated at the upper left hand portion of the diagram. The fifth operation designated D⁵ is the withdrawing of the alining plunger 103 from bearing centering position, and occurs when the cam roller D passes from the inner concentric portion 8ᵇ to the outer concentric portion 8ª of the camway 8. The sixth operation, which takes place immediately after the withdrawing of the plunger 103 from bearing centering position, is designated E⁶ and comprises the moving of the arbor carriage 49 to grinding position, which movement takes places as the cam roller E passes from the cam portion 10ª to the cam portion 10ᵇ of its camway. The seventh operation is the grinding of the bearing, and takes place during the portion of a cycle of the cam parts designated by the line 7 at the lower left hand portion of the diagram. The grinding having been completed the arbor carriage is moved to discharge the bearing from the grinding stone and this operation is designated E⁸, as the movement of the cam E from the part 10ᵇ to the part 10ᶜ of its camway effects such operation. The ram locking means is now moved to its unlocked position by the movement of the cam roller C through the outwardly extending portion 17ᵈ of its camway, and this operation is designated C⁹. The withdrawing of the ram 46 and the ejecting of the bearing from the arbor by the ejector rod 124 now takes place by reason of the cam roller B passing inward through the portion 16^b of its camway, such operation being designated B^10, and shortly after the roller B begins its inward movement through the portion 16^b of its camway the roller D passes into the inner concentric portion 8^b of its camway and effects a moving of the alining plunger to bearing alining position, and this operation is designated D^11.

I wish it understood that the particular machine and the different parts thereof illustrated and described are merely a typical embodiment of one form of my invention, and that the specific construction described herein is merely by way of illustration and not by way of limiting or narrowing my claims, as obviously a great many changes in construction and design can be made without departing from my invention and without affecting the different sub-combinations thereof, and, obviously also, various of the features described can be omitted, leaving the machine still operative to usefully do certain of the work described, and such changes are contemplated by me and would not involve any departure from my invention.

Having thus described my invention, what I claim as new, and desire to secure by Letters Patent, is,—

1. In a machine of the class described, a magazine having a passage therethrough for containing a plurality of articles and through which the articles are intended to feed by gravity, a pair of plungers carried for reciprocatory movements by said magazine and having stop fingers rigidly projecting therefrom into passage obstructing position and in spaced relation longitudinally of the passage, said fingers being relatively adjustable to vary their spacing, means operable to move said plungers in position for their fingers to stand in article obstructing position and means operable to successively and at predetermined intervals independently move said plungers to retract their fingers from article obstructing position, the plunger having the lowermost finger being first in order to be moved and being returned to article obstructing position before the article releasing movement of the other plunger.

2. In a machine of the class described a magazine having a passage therein for containing a plurality of articles and through which they feed by gravity, passage obstructing members disposed in longitudinally spaced relation with respect to the passage and movable to unobstructing position, and means having revoluble parts for separately acting at predetermined intervals on said members to move them to unobstructing position with respect to the magazine passage and then to release them, the lowermost member being the first to be so moved and released, and means for returning the members to obstructing position when released by said first means.

3. In a machine of the class described, an article receiving means having an article delivery passage and transversely reciprocable relative to said passage, means operable to intermittently feed articles to said means when in one position of its movement, and a common mechanism having a rotatable control part and operable to control the action of both said means.

4. In a machine of the class described, an article receiving means having an article delivery passage and transversely reciprocable relative to said passage, means operable to intermittently feed articles to said means when in one position of its movement, and a rotatable member having separate cam means for controlling the action of both said receiving and article feeding means.

5. In a machine of the class described, a holding member, article receiving means movable from receiving to discharging position with respect to said member, means operable to control the movements of said receiver means, and mechanism for controlling the movements of said receiver means and for ejecting an article therefrom when in discharging position and introducing it into said member.

6. In a machine of the class described, a movable article receiving means having an article receiving passage therethrough, transverse to its movement, and rotary cam means operable at predetermined intervals to move said first means from article receiving to article discharging position.

7. In a machine of the class described, means comprising a horizontally pivoted lever member and an article receiver at one end of said member and forming a part thereof, and means coacting with the opposite end of said member and operable to control the pivotal movements thereof to successively move its receiver part from one to the other of its receiving and discharging positions.

8. In a machine of the class described, a swingingly mounted article receiver means having a vertically movable part and article receiving and carrying jaws movably carried by said part for opening and closing movements relative thereto, and rotary means operable in conjunction with said receiver means to periodically move it to first one and then the other of its receiving and discharging positions.

9. In a machine of the class described, a vertically oscillatory article receiver means having an article receiving passage in a part thereof, a rotatable cam wheel, and a part carried by said means and coacting with said wheel to control the oscillatory movements of said means whereby it is intermittently moved to alternately place its article receiving passage in receiving and delivery positions.

10. In a machine of the class described, a magazine, means operable to permit an intermittent feeding of articles from said magazine, and means disposed at the discharge end of the magazine and having a passage for catching articles discharged therefrom, the passage containing portion of said last means being movable transversely of said passage to place the received article in a different position.

11. In a machine of the class described, a movable article receiving means, means operable to intermittently feed articles to said means when in one position of its movement, and means operable to control the movements of said receiving means to intermittently move it to and from its article receiving position.

12. In a machine of the class described, a vertically-oscillatory means having an article receiving passage therein, cam means operable to coact with said receiver means to control the vertical movements thereof whereby the passage in said receiver means is periodically moved from receiving to delivery position and vice versa, and means operable to periodically discharge articles into said receiver means when in receiving position.

13. In a machine of the class described, an arbor having a passage therein, movable means operable to receive an article in one position of its movement and then to move the article transversely of said passage to discharging position, and means operable to discharge an article from said first means when in discharging position and to introduce it into said arbor.

14. In a machine of the class described, an article holding member, movable means operable to receive an article in one position and then to move it to discharging position, and means operable to discharge an article from said first means when in discharging position and to move it a predetermined distance in said holding member.

15. In a machine of the class described, a holding member, article receiving means transversely movable from receiving to discharging position with respect to said member, means operable to control the movements of said receiver means, and means operable when said receiver means is in discharging position to eject an article therefrom and introduce it into said member.

16. In a machine of the class described, a rotatable member, movable means operable to periodically place an article in position to be introduced into said member, and means operable to eject an article from said first means transversely of its movements and introduce it into said member.

17. In a machine of the class described, a rotatable arbor, movable means periodically operable to receive an article in one position and then to move the article transversely of the arbor to discharging position, and means periodically operable to discharge an article from said first means when in discharging position, introduce the article into said arbor and coöperate with the arbor to clamp the article in working position.

18. In a machine of the class described, a rotatable arbor, means movable transversely of the arbor axis to intermittently place an article in the register with the receiving part of the arbor, and means operable to periodically eject an article from said first means and move it to holding position in said arbor.

19. In a machine of the class described, a rotatable arbor, means periodically operable to receive an article in one position, and then to move it transversely of the arbor axis to delivery position, and means having a ram and periodically operable to move said ram to eject an article from said first means into the arbor and to coöperate with the arbor to clamp the article in working position.

20. In a machine of the class described, a rotatable arbor, an article receiver periodically movable transversely of the arbor axis from receiving to delivery position and vice versa, means for periodically delivering an article to said receiver means, and means operable to eject an article from said receiver means when in delivery position, introduce the article into said arbor and coöperate with the arbor to hold the article in working position.

21. In combination, an article holding arbor, an article receiving means movable transversely of the arbor from receiving to delivery position with respect thereto, and a ram movable through a part of said means to discharge an article therefrom and introduce it into said arbor, said receiver means having pivoted article retaining jaws through which the ram passes and which open to disengage the ram when the receiver means is moved from delivery to receiving position.

22. In combination, an article holding arbor, article receiving means periodically movable from article receiving to article delivery position, and vice versa, with respect to said arbor, rotatable means controlling the movements of said receiving means, and a ram automatically movable at predetermined intervals to discharge an article from said receiving means, when in delivery position, and move it to holding position in said arbor.

23. In combination, an article holding arbor, means operable to introduce an article into said arbor and place it in holding position therein, and means operable to impart transverse movements to the arbor at predetermined intervals.

24. In combination, an arbor mounted for rotary and transverse movements, means operable to introduce an article into said arbor and to coöperate therewith to hold it in working position, and means operable to periodically move the arbor transverse to its axis.

25. In combination, an arbor mounted for rotary and transverse movements, a ram periodically movable to introduce an article into said arbor, and to coöperate therewith to clamp it in holding position, said ram being capable of rotary and transverse movements with said arbor.

26. In combination, an article holding arbor, a reciprocatory ram movable to introduce an article into said arbor and to coöperate therewith to hold the article in working position, a rotatable cam member, and means operable by movements of said cam member to impart predetermined movements to said ram, said means having rack and pinion parts.

27. In combination, an article holding arbor, an oscillatory article receiver movable transversely of said arbor, a ram movable to discharge an article from said receiver, when in one position of its movement, and to introduce the article into said arbor, and means operable to impart predetermined reciprocatory movements to said ram and predetermined oscillatory movements to said receiver means.

28. In combination, an article holding arbor, an article receiver movable into and out of register with said arbor, a ram movable through said receiver to discharge an article therefrom and introduce it into said arbor, and means operable to impart predetermined reciprocatory movements to said ram and predetermined movements to said receiver means transversely of the arbor.

29. In combination, an article holding arbor, an article receiver movable transversely of said arbor to successively move articles into discharging position, a reciprocatory ram periodically movable to discharge an article from said receiver, when in delivery position, and to introduce the article into said arbor, means operable to impart predetermined reciprocatory movements to said ram and having a rotary control part, said control part also coacting with said receiver to control the movements thereof relative to said arbor.

30. In combination, a grinding medium, a rotary arbor mounted for transverse movements toward and away from said grinding medium, and means operable to periodically introduce articles into said arbor and place them in position to have grinding contact with said medium when the arbor is transversely moved for such purpose.

31. In combination, a grinding medium, an article holding arbor mounted for rotary and transverse movements with respect to said grinding medium, and means for introducing an article into said arbor and coöperating therewith to clamp the article in grinding position.

32. In combination, a grinding medium, a rotary arbor, means carrying said arbor and operable to transversely move it toward and away from the grinding medium, and a ram operable to introduce an article into said arbor and coöperate therewith to clamp the article in grinding position, said ram being mounted for rotary and transverse movements with the arbor.

33. In combination, a grinding wheel, means for adjusting said wheel transversely of its axis, a movable carriage, an arbor mounted in said carriage, means for introducing an article into holding position in said arbor, and means operable to periodically shift said carriage to transversely move the arbor into and out of article grinding position with respect to said wheel.

34. In combination, a bearing, an arbor mounted for rotary and axial movements in said bearing, said bearing and arbor having interengaging conical thrust portions, a pulley carried by said arbor, and means interposed between said pulley and bearing and operable to yieldingly retain the conical portions of the bearing and arbor in contact.

35. In combination, a rotary arbor, means having a ram and operable to move the ram to introduce an article into said arbor and to coöperate therewith to hold it in working position, and means operable to lock the ram in article holding position.

36. In combination, a rotary arbor, means having a ram and operable to move the ram to introduce an article into said arbor and to coöperate therewith to hold it in working position, and means having a rocker part and operable to periodically move said part to lock the ram in article holding position.

37. In combination, a rotary arbor, means having a ram and operable to move the ram to introduce an article into said arbor and to coöperate therewith to hold it in working position, said ram having a shoulder, and means operable to engage said shoulder and lock the ram in article holding position.

38. In combination, a rotary arbor, means having a ram and operable to move said ram to coöperate with the arbor to clamp and hold an article in working position, and means automatically operable to lock the ram in article holding position and to subsequently release the same.

39. In combination, a rotary arbor, means having a ram and operable to move the ram to introduce an article into said arbor and to coöperate therewith to hold the article in working position, and means operable, when the ram has moved to article holding position, to exert an increased article holding pressure on the ram and to lock it in holding position.

40. In combination, a rotatable arbor, means having a ram and operable to actuate the ram to move an article through a part of the arbor and to coöperate therewith to clamp the article in working position, and means operable to lock the ram in article holding relation to the arbor, the ram when locked to the arbor having rotary movements therewith.

41. In combination, a rotary arbor having an internal shoulder, means having a ram and operable to move the ram to introduce an article into said arbor and coöperate with said shoulder to clamp the article in working position, and means automatically operable, when the ram has moved to article holding position, to lock the ram to the arbor in such holding position and to subsequently release the same preparatory to a retracting movement of the ram.

42. In combination, a rotatable arbor having an article abutting part at one end thereof, means periodically operable to move an article through the arbor to the article abutting part thereof and to coöperate with said part to hold the article in working position and afterward to recede from article holding position, and means automatically operable to exert an increased article holding pressure on the article holding part of said first means when in holding position and subsequently to release the same preparatory to the receding movement of said first means.

43. In combination, a rotary arbor, a ram operable to introduce an article into the arbor and to coöperate therewith to hold the article in working position, and means shiftable lengthwise of the arbor and when shifted in one direction being operable to lock the ram in article holding position.

44. In combination, a rotatable arbor having an internal shoulder, a ram reciprocally movable with respect to said arbor and operable when in one position of its movement to coöperate with the arbor shoulder to clamp an article in working position, and means shiftable axially of the arbor and operable, when shifted in one direction, to lock the ram to the arbor in article holding position.

45. In combination, a rotatable arbor, a member axially shiftable thereon, a ram reciprocally movable axially of the arbor and operable to move an article through a part thereof and to coöperate with the arbor to clamp the article in working position, and means operable by shifting movements of said member to lock and release the ram when in article holding position.

46. In combination, a rotatable arbor, a ram movable through said arbor axially thereof and operable to clamp an article to the arbor in working position, and ram locking means rotatable with said arbor and having a part movable to have locking engagement with the ram and a part movable relative to the arbor to control the movements of said locking part.

47. In combination, an arbor, a ram movable axially through the arbor and operable to clamp an article in working position to the arbor, and means carried by the arbor and operable both to exert an increased article clamping pressure on the ram and to lock the ram to the arbor in article clamping position.

48. In combination, a rotatable arbor, a ram movable axially of the arbor and operable to clamp an article to the arbor in working position, said ram having a groove, means carried by the arbor and operable to move a part thereof into said groove when the ram is in article holding position, and to coact with a wall of said groove both to exert an increased article holding pressure on the ram and to lock it to the arbor.

49. In combination, a rotatable arbor, a ram movable axially of the arbor and operable to clamp an article to the arbor in working position, a rocker member carried by the arbor transversely thereof and operable when rocked in one direction to interengage with said ram when in article clamping position and lock it in such position, and means carried by the arbor and shiftable axially thereof for controlling the rocking movements of said member.

50. In combination, a rotatable arbor, a ram movable axially of said arbor and operable to move an article to a predetermined point therein and then to clamp the article to the arbor in working position, means operable to lock the ram in article clamping position, and mechanism operable to periodically reciprocate the ram and to impart periodical ram locking and releasing movements to said means.

51. In combination, a rotatable arbor, a ram reciprocally movable axially of said arbor and operable to move an article to a predetermined point therein and then to clamp the article to the arbor in working position, means operable to exert an increased article clamping pressure on said ram and to lock the ram to the arbor in article clamping position, and mechanism operable to periodically reciprocate said ram and to periodically actuate said means to release and engage the ram.

52. In combination, a rotatable arbor, a ram movable axially of said arbor and operable to move an article to a predetermined point therein and then to clamp it to the arbor in working position, said ram being capable of rotary movements with the arbor, means carried by the arbor and operable to lock the ram to the arbor when in article clamping position, and mechanism operable to periodically reciprocate said ram and to periodically operate said means to lock and release the ram with respect to the arbor.

53. In combination, a rotatable arbor, a ram movable axially of the arbor and operable to move an article to a predetermined point therein and to clamp it to the arbor in working position, means carried by the arbor and operable to lock the ram to the arbor in article holding position, and mechanism operable to periodically reciprocate the ram and permit it to dwell a predetermined period when in article clamping position and operable to actuate said means to lock the ram to the arbor at the beginning of the article holding dwell of the ram and to actuate said means to release the ram at the end of said dwell.

54. In combination, a rotatable arbor, an article receiver movable into and out of register with the arbor, a ram operable to discharge an article from said receiver when at one position of its movement, introduce the article into said arbor and move it to a predetermined point therein, and means operable to lock the ram to the arbor when it has moved the article a predetermined distance in the arbor.

55. In combination, a rotatable arbor, an article receiver periodically movable from article receiving to article delivery position, a ram movable axially of the arbor and operable to discharge an article from said receiver, when in delivery position, and move the article through and clamp it to a part of the arbor, and means periodically operable to lock the ram to the arbor in article clamping position.

56. In combination, a rotatable arbor, an article receiver movable transversely of the arbor, means for delivering an article to said receiver when in one position of its movement, a ram operable to discharge an article from the receiver when in a different position of its movement, force the article into the arbor, and clamp it to a part thereof, and means operable to lock the ram to the arbor when in work clamping position.

57. In combination, a rotatable arbor, an article receiver periodically movable relative to said arbor, means for periodically delivering articles to said receiver when in one position of its movement, means having a reciprocally movable ram and operable to move said ram to discharge an article from the receiver into the arbor, when the receiver is at one position of its movement, and to clamp the article to the arbor in working position, then permitting the ram to dwell before returning it to starting position, and means operable to lock the ram to the arbor when it has moved to article holding position and to release the ram at the end of its dwell.

58. In combination, a rotary arbor, an article receiver movable from article receiving to article discharging position relative to the arbor, means having a ram and operable to periodically reciprocate said ram and cause it to discharge an article from the receiver when in delivery position, deliver the article to predetermined position in the arbor and clamp it to the arbor in such position, then to dwell in article clamping position and afterward to return to its starting position, means carried by the arbor and operable to lock the ram to the arbor in its dwell position, and mechanism operable to actuate said locking means to periodically lock and release the ram.

59. In combination, a rotatable arbor, an article receiver movable from receiving to delivery positions and vice versa relative to the arbor, said receiver having relatively movable article holding jaws, means having a ram and periodically operable to move the ram to discharge an article from said receiver into the arbor and to clamp it in working position to the arbor, means operable to periodically move said receiver to delivery position and then to retract it from such position when the ram is having its discharging movement between the receiver jaws, and means operable to lock the ram to the arbor when in article clamping position.

60. In combination, a work holding member, a ram operable to move an article to holding position in said member and to coöperate with the member to hold the article, means operable to lock the ram in article holding position to said member, and mechanism having a common rotatable cam part and operable by a rotation of said part to impart predetermined periodical reciprocatory movements to said ram and locking and releasing movements to said locking means.

61. In combination, a rotatable arbor, a ram movable to clamp an article to a part of said arbor, means operable to lock the ram in article clamping position, and means operable to periodically move the arbor into and out of work shaping position during the period of clamping of the article thereto.

62. In combination, a rotatable arbor, means operable to move an article into a part of the arbor and to clamp it thereto in working position, means periodically operable to lock the work holding part of said first means to said arbor, and means operable during the locking period of said locking means to shift the arbor transversely of its axis.

63. In combination, a rotatable arbor, means operable to periodically move articles into the arbor, clamp them in working position thereto and then release the article, means having a part carried by said arbor and automatically operable to lock the article holding part of said first means to the arbor when in article holding position and to release the same prior to the retracting movement of said first means, and means automatically operable to transversely shift the arbor and parts carried thereby during the period of clamping of an article to the arbor.

64. In combination, a rotatable arbor, a reciprocatory ram movable to periodically force an article into the arbor and clamp it in working position thereto, then to dwell in work holding position and then to return to starting position, means operable to lock the ram to the arbor during its period of dwell therein and then to release the ram, and mechanism operable to automatically and periodically reciprocate said ram, actuate said locking means to lock and release the ram, and shift the arbor transversely of its axis during the period of clamping of an article thereto by the ram.

65. In combination, a rotatable control part, a work holding member, means operable by said control part to periodically clamp an article to said member in working position and then to release the same, and means operable by said control part to impart periodical shifting movements to said member to place the article carried thereby into and out of working position.

66. In combination, a rotatable control part, a rotatable member, means operable by said control part for periodically moving successive articles into said member, clamping the articles thereto and remaining at dwell for a predetermined period in clamping relation to said member, and means operable by said control part to shift said member backward and forward transversely of its axis during the clamping of said first means in article clamping position.

67. In combination, a rotatable control part, a rotatable member, means operable by said control part to successively move different articles into said member, clamp them in working position thereto and then to release the same, means operable by said control part for locking the article clamping part of said first means to said member while in article clamping position, and means operable by said control part to shift said member backward and forward transversely of its axis during the period of locking of the clamping part thereof.

68. In combination, a rotatable arbor having a passage therethrough, means for introducing an article into the arbor passage at one end thereof, and means operable at the other end of the arbor to center the introduced article with respect to the arbor and then to withdraw from article centering position.

69. In combination, a rotatable arbor having a passage therethrough, means for introducing an article into the arbor at one end thereof and coöperating with the arbor to hold the article in working position, and means operable at the other end of the arbor to yieldingly coöperate with the arbor and with said first means to center the article with respect to the arbor and then to withdraw from article centering position.

70. In combination, a rotatable arbor having an axial passage therethrough, means for introducing an article into the arbor at one end thereof and means having an article centering member disposed at the opposite end of said arbor in position to have centering engagement with an article when moved into holding position in said arbor by said first means, said centering member being automatically retracted from article centering relation to the arbor after an article has been centered therein.

71. In combination, a rotatable article holding arbor, means operable to move an article to holding position in said arbor, and means operable to center an article with respect to the arbor when moved to holding position therein and then to withdraw from article centering position preparatory to the article being operated on.

72. In combination, a rotatable article holding arbor, means operable to move an article to holding position in said arbor and to coöperate therewith to hold the article, and means operable to center an article with respect to the arbor when moved to holding position therein and then to recede from article centering position.

73. In combination, a rotatable arbor, means operable to successively move articles to holding position in said arbor and to coöperate therewith to hold the articles, and means operable to center each article with respect to the arbor when in holding position therein and then to recede from the article, said centering means having a yieldingly movable chuck part.

74. In combination, a rotatable arbor, means periodically operable to successively move articles to working position in said arbor and to clamp the articles in such position, an article centering chuck, and means for periodically reciprocating said chuck to move it into and out of article coacting and centering position with respect to the arbor.

75. In combination, a rotatable arbor, a ram movable into and out of said arbor to successively place articles in holding position therein and to clamp the articles in such position to the arbor, a plunger reciprocally movable in axial relation to the arbor and having a socket into which the articles successively enter and are centered with respect to the arbor when in holding position, and means periodically operable to move said plunger away from and toward the arbor after each centering operation.

76. In combination, a rotatable arbor having an axial passage therethrough, means operable at spaced intervals to introduce an article into said arbor at one end thereof, move it to the other end thereof and then to clamp the article to the arbor in axially projecting relation thereto, and means operable to center each article with respect to the arbor when moved to holding position therein and to then recede from article holding position.

77. In combination, a rotatable arbor having a passage therethrough with the outer end of its passage wall restricted, means periodically operable to introduce an article into said passage at its inner end and move it to and hold it in clamping engagement with the restricted end wall of the passage, and means operable to center each article with respect to the arbor when in clamping position therein and then to recede from centering engagement with the article.

78. In combination, a rotatable work holding arbor, means for moving an article to holding position in said arbor, a reciprocatory sleeve, means for periodically reciprocating said sleeve toward and away from the arbor, and a centering plunger carried by said sleeve for yielding axial movements therein and movable into and out of article centering relation to said arbor by movements of said sleeve.

79. In combination, a rotatable arbor, means for moving an article axially of the arbor to holding position therein, means operable to move a part thereof into article centering position with respect to the arbor and then to recede from such position, said arbor and parts of said article moving and centering means being shiftable transversely of the arbor axis.

80. In combination, a shiftable carriage, an arbor rotatably mounted in said carriage with its axis at an angle to the shifting movements of said carriage, means operable to move an article into holding position in said arbor and to clamp it in such position thereto, an article centering member mounted in said carriage for movements axially of said arbor, and means operable to periodically move said member into and out of article centering relation to the arbor.

81. In combination, a shiftable carriage, an arbor rotatably mounted in said carriage with its axis at an angle to the shifting movements thereof, means operable to move an article to holding position in said arbor and to clamp it thereto with an end of the article projecting from an end of the arbor, an article centering plunger carried by said carriage and movable into and out of centering engagement with an article clamped to the arbor, the movements of said plunger being axially of the arbor, and means operable to impart periodical reciprocatory movements to said member.

82. In combination, a rotatable arbor, means operable to periodically move an article into holding position in said arbor and to clamp it thereto in such position, means automatically operable to lock the article holding part of said first means to said arbor in article holding position and to subsequently release the same, and means automatically operable to center an article with respect to the arbor when in holding position therein and then to recede from centering position.

83. In combination, a rotary arbor, a ram operable to move an article into holding position in said arbor and to clamp it thereto in such position, means automatically operable to lock the ram to the arbor for a predetermined period while in article holding position, and article centering means periodically movable into and out of article centering position with respect to the arbor.

84. In combination, a rotatable arbor, means operable to periodically place articles in holding position in said arbor and to clamp them to the arbor in such position, means having a part carried by the arbor and automatically operable to lock the article clamping part of said first means to the arbor for a predetermined period after each article placing movement thereof, and article centering means periodically movable into and out of article centering relation to said arbor.

85. In combination, a rotatable arbor, a ram operable to move an article to holding position in said arbor and then to clamp it to the arbor, means carried by the arbor and operable to lock the ram in article clamping position, article centering means movable into and out of article centering position with respect to the arbor, and mechanism operable to impart periodical reciprocatory movements to said ram, to periodically actuate said locking means to lock and release the ram, and to periodically move said centering means into and out of article centering position.

86. In combination, a rotatable arbor, a rotatable control member, means operable by said control member to periodically move articles into said arbor and to clamp them in holding position therein, means operable by said control member to lock the article holding part of said first means in article holding position and subsequently to release the same, and article centering means periodically movable into and out of article centering relation to said arbor by said control part.

87. In combination, a rotatable arbor, a mount for said arbor shiftable transversely of its axis, a ram operable to move articles into the arbor and to clamp them thereto in working position, means operable to lock the ram to the arbor in article clamping position, article centering means movable into and out of article centering relation to said arbor, and mechanism operable to periodically reciprocate said ram, to actuate said locking means to periodically lock and release the ram with respect to the arbor, to periodically shift the arbor mount, and to periodically move the article centering means into and out of centering position.

88. In combination, a rotatable arbor having a passage therein, an article receiver having an article receiving part movable into and out of register with the arbor passage, means for periodically feeding articles to said receiver when in one position of its movement, means for periodically ejecting articles from said receiver when in another position of its movement and moving them to holding position in the arbor, and article centering means periodically movable into and out of article centering relation to the arbor.

89. In combination, a rotatable arbor having a passage therein, an article receiver having an article receiving part movable into and out of register with the arbor passage, means for periodically feeding articles to said receiver when in one position of its movement, means for periodically ejecting articles from said receiver when in another position of its movement and moving them to holding position in the arbor, article centering means periodically movable into and out of article centering relation to said arbor, and a mechanism operable to control the predetermined timed movements of said receiver, delivery means, ram and centering means.

90. In combination, means for clamping and rotating an article, means operable to center articles held by said means and then to recede therefrom, and means operable to periodically clean the article centering part of said centering means.

91. In combination, means operable to clamp and rotate an article, means having an article centering chuck and operable to periodically move said chuck into and out of article centering relation to said clamping means, and means automatically operable to discharge a fluid under pressure through said centering chuck to clean it before each centering operation.

92. In combination, means operable to clamp and rotate an article, means having an article receiving cavity and operable to center an article in said clamping means, and means operable to periodically discharge a cleaning fluid into the cavity of said centering means and to eject an article from said clamping means.

93. In combination, rotatable article holding means, means movable into and out of article centering relation to said holding means to center an article held thereby, an ejector of tubular form periodically movable to eject an article from said holding means, and means periodically operable to discharge a cleaning fluid through said ejector and into the article receiving part of said centering means.

94. In combination, a rotatable article holding means, article centering means periodically movable into and out of article centering relation to said holding means, a tubular ejector member reciprocally movable through the center part of said ejector means and into said holding means to eject an article therefrom, and means automatically operable at a predetermined point in an ejecting movement of said member to discharge a fluid under pressure therefrom into the article centering means.

95. In combination, means for holding a work piece, and means operable to eject a work piece from said holding means and at a predetermined point in its ejecting movement to discharge a cleaning fluid therefrom.

96. In combination, work holding means, a reciprocally movable work ejector part of hollow form having communication with a source of fluid under pressure, a valve operable to open and close the communication between said part and the source of fluid supply, and means operable to open said valve when the ejector part is at a predetermined point in its ejecting movement.

97. In combination, work holding means, work ejecting means having a reciprocally movable ejector part with a passage therein in communication with a source of fluid under pressure, a normally closed valve controlling said communication, and means automatically operable to coact with and open said valve at a predetermined point in its article ejecting movement and to maintain the valve open for a portion of such movement.

98. In combination, rotatable work holding means, work centering means movable axially of said holding means into and out of work centering relation thereto, means operable to periodically eject work from said holding means and having a reciprocally movable ejector part which is provided lengthwise thereof with a passage in communication with a source of fluid under pressure, a valve normally closing said communication, and trip means disposed in the path of movement of a portion of said valve and operable to coact with and open said valve at a predetermined point in an ejecting movement of said part and to maintain the valve open for a portion of the ejecting movement of said part to discharge a cleaning fluid into said centering means.

99. In combination, rotatable work holding means, a work centering chuck periodically movable toward and away from said means, and an article ejector part periodically movable through said centering chuck and a part of said work holding means axially thereof.

100. In combination, rotatable work holding means, a work centering chuck periodically movable into and out of work centering relation to said holding means axially thereof and having a yieldable centering part, and means periodically operable to move a part thereof axially through said centering means and holding means to discharge work from the latter.

101. In combination, a rotatable arbor, means operable to move an article into holding position in said arbor and to clamp it thereto in such position, a centering chuck movable axially of the arbor into and out of article centering relation, means operable to periodically move said centering chuck, and means operable to project a part thereof through said centering chuck and arbor to eject an article from the arbor when released by said holding means.

102. In combination, a rotatable arbor, a ram operable to place an article in holding position in said arbor and to clamp it thereto in such position, an article centering chuck movable into and out of centering relation to the arbor, an ejector rod movable through the centering chuck and into the arbor to eject an article therefrom when released by said ram, and mechanism operable to periodically move said ram and ejector rod in unison and to control the movements of said chuck.

103. In combination, a rotatable arbor, a work introducing and holding ram and an ejector rod axially alined and longitudinally spaced, and means periodically operable to reciprocate said ram and ejector rod to cause the ram to introduce an article into the arbor and clamp it thereto in working position and subsequently to move the ram to release the article and to move the ejector rod to eject the article from the arbor in the opposite direction to its movement into the arbor.

104. In combination, a rotatable arbor, means periodically operable to introduce an article into the arbor and to clamp it in working position therein, article centering means periodically movable into and out of article centering position with respect to the arbor, and means operable to eject an article from the arbor when released by said clamping means and to discharge a cleaning fluid into the centering means, preparatory to the next centering operation.

105. In combination, a rotatable arbor having an axial passage therethrough, an article centering member at one end of the arbor in axial register with its passage, means operable to periodically move said member into and out of article centering position, means operable to periodically force articles through said arbor passage in centering contact with said centering member and then to clamp the articles in working position in the arbor, and means periodically operable to move a part thereof through said centering member and into the arbor passage to eject an article therefrom when released by said introducing and clamping means.

106. In combination, a rotatable arbor having an axial passage therethrough, a centering member disposed at one end of the arbor in axial register with its passage and automatically operable to move into and out of article centering position, means operable to periodically move an article through the arbor passage into centering contact with said centering member and then to clamp the article to the arbor in centering position, and means having a part reciprocally movable through said centering member and arbor passage and operable to discharge a cleaning fluid into the centering member before the next centering operation and to eject an article from the arbor when released by said clamping means.

107. In combination, a grinding wheel, rotatable article holding means, article centering means periodically movable into and out of centering relation to said holding means, and means for periodically moving the holding means to place the article carried thereby in grinding relation to said wheel.

108. In combination, a grinding wheel, a rotatable arbor, means operable to move a work piece into and clamp it in grinding position to said arbor, means operable to center the work piece when moved to clamping position in the arbor and then to recede from centering position, and means operable to relatively move the arbor and grinding wheel to place the article in grinding engagement with the wheel after the centering means has receded from centering position.

109. In combination, a grinding wheel, a rotatable arbor, a ram operable to move a work piece into the arbor and to clamp it in grinding position therein, means automatically operable to center the work piece with respect to the arbor when moved to clamping position therein and then to recede from centering position, means operable to relatively move the arbor, ram and centering means after the movement of the centering means from centering position and to place the work piece in engagement with the grinding wheel, and an ejector rod movable through a part of said centering means and operable to eject the ground work piece from the arbor after the grinding operation.

110. In combination, a rotatable arbor, a ram operable to move a work piece into said arbor and to clamp it thereto in operative position, means operable to periodically lock and release the ram when in article clamping position, article centering means movable into and out of article centering relation to said arbor, an ejector member operable to eject an article from said arbor when released by said ram, and mechanism operable to control the movements of said ram, locking means, centering means and ejector member in predetermined order.

111. In combination, a rotatable arbor, article receiver means periodically movable into and out of article delivery position, a ram periodically operable to eject an article from said receiver means when in delivery position and to move it into and clamp it in operative position in said arbor, article centering means periodically movable into and out of article centering relation to said arbor, an ejector member periodically movable through said arbor to eject an article therefrom, and mechanism operable to control the movements of said receiver means, ram, centering means and ejector member in predetermined order.

112. In combination, a rotatable arbor, article receiver means periodically movable into and out of article delivery position, a ram periodically operable to eject an article from said receiver means when in delivery position and to move it into the arbor and clamp it in operative position therein, means periodically operable to lock the ram in article clamping position and subsequently to release the same, article centering means periodically movable into and out of article centering relation to said arbor, an ejector member periodically operable to eject an article from said arbor, and mechanism operable to automatically control the movements of said receiver means, ram, locking means, centering means and ejector member in predetermined order.

113. In combination, a rotatable arbor, article receiver means periodically movable into and out of article delivery position, means operable to periodically deliver articles to said receiver means when in receiving position, a ram periodically operable to eject an article from the receiver means when in delivery position and to move it into and clamp it in operative position in said arbor, article centering means periodically movable into and out of article centering relation to said arbor, an ejector member periodically operable to eject an article from said arbor, and mechanism operable to control the movements of said receiver means, article feeding means, ram centering means and ejector member in predetermined order.

114. In combination, a rotatable arbor, article receiver means periodically movable into and out of article delivery position, means periodically operable to feed articles to said receiver means, means periodically operable to eject an article from said receiver means when in delivery position and to move it into and clamp it in operative position in said arbor, means periodically operable to lock said clamping means in article clamping relation to said arbor, article centering means periodically movable into and out of article centering relation to the arbor, an ejector means periodically movable to eject an article from the arbor, and mechanism operable to control the movements of said receiver means, feeding means, clamping means, centering means and ejector means in predetermined order.

115. In combination, a rotatable arbor, means operable to periodically move articles into holding position in said arbor, said arbor and means being transversely adjustable as a unit.

116. In combination, a machine frame, a frame part adjustably carried by said frame, a rotatable arbor carried by said frame part, and means carried by said frame part and operable to periodically move articles to holding position in the arbor.

117. In combination, a rotatable arbor, means operable to move articles into said arbor and to clamp them in working position thereto, means for locking said first means in work clamping position relative to said arbor, and means carrying said arbor, clamping means and locking means and operable to adjust the positions thereof as a unit.

118. In combination, an adjustable frame part, a rotary arbor carried by said part, means operable to move an article into said arbor and to clamp it thereto in working position, and means operable to lock said clamping means in clamping position, said two means being carried by said frame part.

119. In combination, a frame-part mounted for adjusting movements, a carriage movably mounted on said frame-part, a rotatable arbor mounted in said carriage, and means carried by said frame-part, and operable to periodically move articles into holding position in said arbor.

120. In combination, a rotatable arbor, means operable to periodically move a work piece to holding position in said arbor, and a frame part mounted for horizontal pivotal adjustment and carrying both said arbor and means for adjustment as a unit therewith.

121. In combination, a frame part mounted for horizontal pivotal adjustment, a carriage shiftably mounted on said frame part, an arbor rotatably mounted in said carriage, and means carried by said frame part and periodically operable to move work pieces into holding position in said arbor.

122. In combination, a frame part mounted for horizontal adjusting movements, a carriage mounted on said frame part for shifting movements relative thereto, an arbor rotatably mounted in said carriage, means carried by said frame part and operable to periodically move articles into holding position in said arbor, and means carried by said frame part and operable to periodically impart predetermined shifting movements to said carriage.

123. In combination, a rotatable arbor, means operable to periodically move articles into work holding position in said arbor, work centering means operable to periodically move a part thereof into and out of article centering relation to said arbor, and an adjustably mounted frame part carrying said arbor, article moving means and article centering means for adjustment as a unit therewith.

124. In combination, a work shaping part, work holding means, work centering means periodically movable into and out of centering relation to said holding means, and means carrying said work holding means and centering means and movably mounted to adjust said means as a unit with respect to the shaping means.

125. In combination, work shaping means, a frame part mounted for horizontal pivotal adjusting movements with respect to said means, a carriage mounted on said frame part for movements toward and away from said shaping means, an arbor rotatably mounted in said carriage, and means carried by said frame part and operable to move work pieces into holding position in said arbor.

126. In combination, work shaping means, a frame part mounted for pivotal adjusting movements with respect to said means, a rotatable arbor carried by said frame part and periodically movable into and out of work shaping position with respect to said shaping means, and mechanism carried by said frame part for adjustment therewith and operable to periodically move work pieces into holding position in the arbor and to impart periodical shifting movements to said arbor.

127. In combination, a frame part mounted for horizontal adjusting movements, an arbor rotatably carried by said frame part for shifting movements relative thereto toward and away from a work shaping member, a receiver means carried by said frame part and movable into and out of delivery position with respect to said arbor, a ram carried by said frame part and movable to eject an article from said receiver means into said arbor and to coact with the arbor to clamp the article in working position, and mechanism carried by said frame part and operable to impart predetermined shifting movements to said arbor and to said ram and to control the movements of said receiver means.

128. In combination, a rotatable arbor, means periodically operable to introduce a work piece into the arbor and to clamp it in working position therein, means periodically operable to move articles into position to be introduced into the arbor by said first means, means periodically operable to lock said introducing means in article clamping position with respect to said arbor, means operable to control the action of said several means, and a frame part mounted for horizontal pivotal adjusting movements and carrying said arbor and said several means for unitary adjustment therewith.

129. In combination, an arbor having a passage therethrough, a member mounted for reciprocatory movements at one side of said arbor in parallel relation to its axis, and two ram parts carried by said member for movements therewith and in alinement with the arbor passage, one part being operable to force an article into holding position in the arbor when the member is moved in one direction and the other part being operable to eject an article from the arbor when the member is moved in the opposite direction, and means operable to impart predetermined reciprocatory movements to said member.

130. In combination, a rotatable arbor having a work receiving passage therethrough, and introducing and ejecting rams disposed in longitudinally spaced relation and having reciprocatory movements together, one ram at one stroke operating to introduce an article into holding position in the arbor and the other ram on the return stroke operating to eject the article from the arbor.

131. In a machine of the class described, a rotatable arbor, means having two longitudinally spaced rams which are both reciprocally movable through the arbor, one to introduce and hold an article in working position in said arbor and the other to eject an article from the arbor after being operated on.

132. In combination, a rotary work holding arbor having an axially disposed passage therethrough, a work introducing ram and a work ejecting ram movable into said arbor passage from opposite directions, and means connecting said rams to impart predetermined reciprocatory movements thereto in unison.

133. In combination, two relatively movable parts, a grinding member carried by one and a work holding means carried by the other of said parts, means normally urging a movement of one of said parts relative to the other, and means operable to move said movable part in the opposite direction and to control its movements, said means comprising a lever having a bearing against said movable part which varies in position lengthwise of the lever as the lever is moved, and a member coacting with said lever to control the oscillatory movements thereof.

134. In a machine of the class described, a work receiver, a work-holding arbor mounted for movements into and out of register with said receiver, and means automatically operable to discharge an article from said receiver and into said arbor when the arbor is in one position of its movement.

135. In a machine of the class described, a movable work-holding member, a work-holding magazine, a work receiver movable into and out of register with said magazine, means operable to discharge a work piece from said receiver and into said work-holding member, and mechanism automatically operable to impart successive predetermined movements to said work-holding magazine to operate it to deliver articles at predetermined intervals to said receiver, to periodically move said receiver into and out of register with said magazine, and to periodically operate said discharging means to deliver articles from said receiver to said member.

136. In a machine of the class described, a movable work-holder, a work receiver mounted for oscillatory movements, means operable to periodically move said work-holder into and out of register with said receiver when in work delivery position, and means for oscillating said receiver to periodically move it to and from work delivery position.

137. In a machine of the class described, a movable work-holder, a work receiver mounted for oscillatory movements, means for moving said work-holder into and out of register with said receiver when the latter is in delivery position, and means operable to periodically oscillate said receiver to and from work delivery position and to periodically deliver work therefrom into said work holder.

138. In a machine of the class described, an oscillatory work receiver, a work holder movable into and out of register with said receiver, and mechanism operable to oscillate said work receiver, periodically deliver work thereto when in one position and discharge work therefrom into engagement with said holder when in another position.

139. In a machine of the class described, a work receiver, means operable to periodically move said receiver from receiving to delivery position and vice versa, and means having a reciprocatory control member periodically operable to forcefully eject work pieces from said receiver.

140. In a machine of the class described, a movable work receiver, and separate means having a common control part operable to periodically move said receiver from work receiving to work delivery position and vice versa, and to periodically forcefully eject work pieces from said receiver when in work delivery position.

141. In combination, an article holding arbor, mechanism automatically operable to periodically deliver articles into introducing relation to said arbor, and means having a ram automatically operable to discharge articles into the arbor from said mechanism and to coöperate with the arbor to hold the articles in working position therein.

142. In combination, an abrading member and a work holding member, means for imparting to and fro movements to one of said members relative to the other, and means operable to periodically introduce an article into said work holding member and to coöperate therewith to clamp the article in position to be acted on by the abrading member.

143. In combination, a rotary arbor having a passage therethrough which is internally shouldered at one end, and means having a ram and operable to move the ram to introduce an article into said passage and to coöperate with the shouldered end of the wall thereof to grip and hold it in working position.

144. In combination, a work-holder having a passage therethrough which is shaped at its forward end to prevent the complete passage of an article therethrough, and means having a ram and operable to periodically move the ram to introduce an article into the rear end of said passage, move it to the opposite end and coöperate therewith to hold the article in working position a predetermined period and then to retract.

145. In combination, an abrading member, an arbor, a ram movable to clamp an article to a part of said arbor, means operable to lock the ram in article clamping position, and means operable to periodically move one of said member and arbor into and out of work shaping position during the period of clamping of the article to the arbor.

146. In combination, a rotatable arbor having a passage therethrough, means for introducing an article into the arbor passage at one end thereof, and means operable at the other end of the arbor to center the introduced article with respect to the arbor.

147. In combination, a rotatable arbor having an axial passage therethrough, means for introducing an article into the arbor at one end thereof, and means having an article centering member disposed at the opposite end of said arbor in position to have centering engagement with an article when moved into holding position in said arbor by said first means.

148. In combination, a rotatable article holding arbor, means operable to move an article to holding position in said arbor and to coöperate therewith to hold the article, and means operable to center an article with respect to the arbor when moved to holding position therein.

149. In combination, a rotatable arbor having an axial passage therethrough, means operable at spaced intervals to introduce an article into said arbor at one end thereof, move it to the other end thereof, and then clamp the article to the arbor in axially projecting relation thereto, and means operable to center each article with respect to the arbor when moved to holding position therein.

150. In combination, work holding means, a work centering chuck, and an article ejector part periodically movable through said centering chuck and a part of said work holding means axially thereof.

151. In a machine of the class described, a movable article receiving means having an article receiving passage therethrough transverse to its movement, and means operable at predetermined intervals to move said first means from article receiving to article discharging position.

152. In a machine of the class described, means comprising a horizontally pivoted lever member, an article-receiver at one end of said member and forming a part thereof, and means coacting with said member and operable to control the pivotal movements thereof to successively move its receiver part from one to the other of its receiving and discharging positions.

In testimony whereof I have hereunto signed my name to this specification.

WILLIAM EMIL BOCK.